(12) United States Patent
Shim

(10) Patent No.: US 7,925,275 B2
(45) Date of Patent: *Apr. 12, 2011

(54) METHOD OF AREA-BASED POSITIONING USING OMA SECURE USER PLANE LOCATION IN MOBILE COMMUNICATIONS SYSTEM

(75) Inventor: Dong-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/720,635

(22) Filed: Mar. 9, 2010

(65) Prior Publication Data

US 2010/0167757 A1    Jul. 1, 2010

Related U.S. Application Data

(63) Continuation of application No. 11/501,886, filed on Aug. 10, 2006, now Pat. No. 7,706,813.

(60) Provisional application No. 60/707,167, filed on Aug. 11, 2005, provisional application No. 60/707,168, filed on Aug. 11, 2005, provisional application No. 60/716,499, filed on Sep. 14, 2005, provisional application No. 60/716,517, filed on Sep. 14, 2005, provisional application No. 60/724,795, filed on Oct. 11, 2005, provisional application No. 60/741,054, filed on Dec. 1, 2005, provisional application No. 60/762,122, filed on Jan. 26, 2006, provisional application No. 60/795,184, filed on Apr. 27, 2006, provisional application No. 60/810,631, filed on Jun. 5, 2006.

(30) Foreign Application Priority Data

Mar. 30, 2006    (KR) ..................... 10-2006-0029135
Jul. 27, 2006    (KR) ..................... 10-2006-0071045

(51) Int. Cl.
*H04W 24/00*        (2009.01)
(52) U.S. Cl. ............... 455/456.3; 455/404.2; 455/414.2; 455/440; 340/988; 340/968
(58) Field of Classification Search ............. 455/404.2, 455/414.2, 440, 456.3; 340/988–996
See application file for complete search history.

(56) References Cited

U.S. PATENT DOCUMENTS 7,149,504 B1    12/2006 Weaver et al.
(Continued)

FOREIGN PATENT DOCUMENTS

KR    10-2004-0060811 A    7/2004
(Continued)

OTHER PUBLICATIONS

Shing Dong-Hee—Area-Based Positioning method in Mobile Communications System (Publication not available)—U.S. Appl. No. 12/720,642.*

(Continued)

*Primary Examiner* — Nick Corsaro
*Assistant Examiner* — Quan M Hua
(74) *Attorney, Agent, or Firm* — Birch, Stewart, Kolasch & Birch, LLP

(57) ABSTRACT

A positioning method in a SUPL based position information (positioning) system, and particularly a positioning method capable of variously efficiently performing an area-based positioning (location tracking) performed by a location server or a mobile communications terminal when the location server and the mobile communications terminal respectively manage triggers generating the area-based positioning.

22 Claims, 18 Drawing Sheets

U.S. PATENT DOCUMENTS

| | | | |
|---|---|---|---|
| 7,254,388 | B2 | 8/2007 | Nam et al. |
| 7,593,722 | B2 | 9/2009 | Jagadeesan et al. |
| 7,627,332 | B2 | 12/2009 | Shim |
| 7,706,813 | B2 * | 4/2010 | Shim .................. 455/456.3 |
| 7,778,639 | B2 | 8/2010 | Shim |
| 2004/0157620 | A1 | 8/2004 | Nyu |
| 2004/0192337 | A1 | 9/2004 | Hines et al. |
| 2004/0203863 | A1 | 10/2004 | Huomo |
| 2004/0203885 | A1 | 10/2004 | Quaid |
| 2004/0242238 | A1 | 12/2004 | Wang et al. |
| 2005/0043038 | A1 | 2/2005 | Maanoja et al. |
| 2005/0099972 | A1 | 5/2005 | Motegi et al. |
| 2005/0118999 | A1 | 6/2005 | Zhu |
| 2005/0136942 | A1 | 6/2005 | Timiri et al. |
| 2005/0239480 | A1 | 10/2005 | Kim et al. |
| 2005/0250516 | A1 | 11/2005 | Shim |
| 2006/0003775 | A1 | 1/2006 | Bull et al. |
| 2006/0014531 | A1 | 1/2006 | Nam et al. |
| 2006/0030333 | A1 | 2/2006 | Ward et al. |
| 2006/0063536 | A1 | 3/2006 | Kim et al. |
| 2006/0276167 | A1 | 12/2006 | Burroughs |
| 2007/0096981 | A1 | 5/2007 | Abraham |
| 2007/0182547 | A1 | 8/2007 | Wachter et al. |
| 2007/0281670 | A1 | 12/2007 | Shim |
| 2007/0286212 | A1 | 12/2007 | Kim et al. |
| 2010/0167757 | A1 | 7/2010 | Shim |
| 2010/0167759 | A1 * | 7/2010 | Shim .................. 455/456.2 |

FOREIGN PATENT DOCUMENTS

| | | | |
|---|---|---|---|
| KR | 10-2005-0101112 A | | 10/2005 |
| KR | 10-2006-0024305 A | | 3/2006 |
| KR | 10-2006-0025973 A | | 3/2006 |
| RU | 2359282 C2 | | 12/2008 |
| WO | WO-03/045101 A1 | | 5/2003 |
| WO | WO-2004/080096 A2 | | 9/2004 |

OTHER PUBLICATIONS

Guojun et al., "About Optimization Area Event Handing Proxy Mode," OMA-LOC-2006-0153R03-CR-SUPL-2.0-TS-About-Optimization-Area-Event-Handling-Proxy-Mode, Jun. 2, 2006, pp. 1-9, XP002566950. Retrieved from the Internet on Feb. 4, 2010.

Qualcomm, "Addition of Periodic Location Procedures," 3GPP TSG SA WG2, XX, XX, No. S2-051536, Jun. 27, 2005, pp. 1-26, XP002410621.

Shim et al., "Notification based on current location—Non proxy mode," OMA-LOC-2006-0076R01-CR-SUPL_2_0_AD_Optimization-Area-Event-Handling-Proxy-Mode, Mar. 27, 2006, pp. 1-6, XP002566834, Retrieved from the Internet on Feb. 4, 2010.

Watcher et al., "SUPL 1.0 AD Area Event Triggered Services for SI Proxy," OMA-LOC-2006-0013R01-CR-2_0-AD-Area-Event-Triggered-Services-for-Ni-Proxy, Feb. 2, 2006, pp. 1-12, XP002566835, Retrieved from the Internet on Feb. 4, 2010.

Watcher et al., "SUPL 2.0 AD Area Event Triffered Services for SI Proxy," OMA-LOC-2006-0014R01-SUPL-2_0-AD-Area-Event-Triggered-Services-for-SI-Proxy, Feb. 2, 2006, pp. 1-10, XP002566949, Retrieved from the Internet on Feb. 4, 2010.

Kim et al., "OMA-LOC-2004-0144-CR-Deferred_Location_Request_for_Area_Event," May 17, 2004, pp. 1-5, XP002566434, <URL:http://member.openmobilealliance.org/ftp/Public_documents/LOC/2004/>, [Retrieved Feb. 2, 2010].

Kim et al., "OMA-LOC-2004-0162R02-CR-Combined_Deferred_Location_Request," OMA-LOC WG, Jun. 13, 2004, pp. 1-5, XP002566433, <URL:http://member.openmobilealliance.org/ftp/Public_documents/LOC/2004> [Retrieved on Feb. 2, 2010].

Kim, "OMA-LOC-2005_0365-SET_Init_NonRoaming-NonProxy_Deferred_Service," OMA-LOC WG, Aug. 12, 2005, pp. 1-4, XP002566436, <URL:http://member.openmobilealliance.org/ftp/Public_documents/LOC/2005/> [Retrieved on Feb. 2, 2010].

Kim, "OMA-LOC-Network Initiated Deferred Service-NonRoaming-NonProxy," OMA-LOC WG, Aug. 12, 2005, pp. 1-5, XP002566437, <http://member.openmobilealliance.org/ftp/Public_documents/LOC/2005/> [Retrieved on Feb. 2, 2010].

Shim, "OMA-LOC-2004-0148R01-CR-SUPL_AD_SET_Initiated_Deferred_Message_Flows," OMA LOC WG, Jun. 15, 2004, pp. 1-3, XP002566435, <URL:http://member.openmobilealliance.org/ftp/Public_documents/LOC/2004/> [Retrieved on Feb. 2, 2010].

W. Kim "OMA-LOC-2004-0185-CR-Separate_Periodic_Location_Request", Jun. 13, 2004, XP002552113, Retrieved from the Internet: URL:http://member.openmobilealliance.org/ftp/Public_documents/LOC/2004/OMA-LOC-2004-0185-CR-Separate_Periodic_Location_Request.zip>, [retrieved on Oct. 22, 2009], pp. 1-5.

J. Wang, et al., "OMA-LOC-2004-136R032-CR_SUPL_AD_Message_Periodic Call Flows", Jun. 12, 2004, XP002552114, Retrieved from the Internet: URL:http://member.openmobilealliance.org/ftp/Public_documents/LOC/2004/OMA-LOC-2004-0136R03-SUPL_Periodic_Call_Flows.zip>, [retrieved on Oct. 22, 2009], pp. 1-7.

Open Mobile Alliance: "Secure User Plane Location Architecture—Draft Version 1.0—Jun. 28, 2005", Jun. 28, 2005, XP002552115, Retrieved from the Internet: URL:http://member.openmobilealliance.org/ftp/Public_documents/LOC/Permanent_documents/OMA-AD-SUPL-V1_0-20050628-D.zip>, [retrieved on Oct. 22, 2009], pp. 1-80.

TSG SA WG2 (S2-030985) Technical Specification Group Services and System Aspects Meeting #19, TSGS#19(03)0127 (XP050199061), Mar. 2003.

Open Mobile Alliance: "Secure user plane location service stage 2 specification—Draft version 1.0—Dec. 19, 2003," Retrieved from internet: URL:http://www.openmobilealliance.org/copyright.html, OMA-LOC-SUPL-Spec-Stage-2-V1_0-20031219-D, Dec. 2003, pp. 1-89.

Shim et al., "Optimization of area event handling," OMA-LOC-2006-0076R01-CR-SUPL_2_0_AD_Optimization-Area-Event-Handling-Proxy-Mode Change Request, Mar. 27, 2006, pp. 1-6.

* cited by examiner

METHOD OF AREA-BASED POSITIONING USING OMA SECURE USER PLANE LOCATION IN MOBILE COMMUNICATIONS SYSTEM

RELATED APPLICATION

The present application is a continuation of U.S. patent application Ser. No. 11/501,886 filed Aug. 10, 2006 now U.S. Pat. No. 7,706,813, which claims priority to U.S. Provisional Application No. 60/707,167 filed on Aug. 11, 2005, U.S. Provisional Application No. 60/707,168 filed on Aug. 11, 2005, U.S. Provisional Application No. 60/716,499 filed on Sep. 14, 2005, U.S. Provisional Application No. 60/716,517 filed on Sep. 14, 2005, U.S. Provisional Application No. 60/724,795 filed on Oct. 11, 2005, U.S. Provisional Application No. 60/741,054 filed on Dec. 1, 2005, U.S. Provisional Application No. 60/762,122 filed on Jan. 26, 2006, Korean Application No. 10-2006-0029135, filed on Mar. 30, 2006, U.S. Provisional Application No. 60/795,184 filed on Apr. 27, 2006, U.S. Provisional Application No. 60/810,631 filed on Jun. 5, 2006, Korean Application No. 10-2006-0071045, filed on Jul. 27, 2006. All these applications are expressly incorporated by reference in their entirety.

BACKGROUND OF THE INVENTION

1. Field of the Invention

The present invention relates to a mobile communications system, and particularly, to an area-based positioning method in a positioning system based upon Secure User Plane Location (SUPL).

2. Background of the Invention

In general, a mobile communications system has a function unit related to calculating of position of a mobile communications terminal (referred to as just a 'terminal' hereafter) in a mobile communications network, and thus provides location services for transferring the location of the terminal to a certain entity periodically or according to a user's request.

Networks related to the location services have different structures according to an inner network structure of 3GPP or 3GPP2. The current location of the terminal can be calculated using a cell-ID method for transferring a cell ID to which the terminal belongs, a method in which a time taken by transferring a radio wave from a terminal to each base station is calculated and a location of the terminal is then calculated using a triangulation, a method using a Global Positioning System (GPS), and the like.

However, in order to provide location services to a user using the position calculation (positioning) method, considerable signaling and position information should be sent and received between the terminal and a location server. The so-called positioning technologies that have been standardized for providing such location services, namely, a location service based upon the location (position) of a terminal, are undergoing rapid widespread dissemination. The technologies can typically be provided through a user plane and a control plane. A Secure User Plane Location (SUPL), which is well-known as an example of the positioning technologies, provides the location services through the user plane The SUPL is an efficient method for transferring position information required for the location calculation of a terminal. The SUPL protocol transfers positioning assistance information such as Global Positioning System (GPS) assistance. The SUPL employs a user plane data bearer to carry positioning technology associated protocols between the mobile terminal and a network.

In general, in a positioning system, a SUPL network related to a location service roughly includes a SUPL agent, SUPL Location Platform (SLP) and SUPL Enabled Terminal (SET). The SUPL agent denotes a logical service access point using position information which is actually measured. The SLP denotes a SUPL service access point within a network portion where network resources are accessed to obtain position information. The SET denotes a device for communicating with the SUPL network using a SUPL interface. The SET may denote, for instance, one of a User Equipment (UE) of UMTS, a Mobile Station (MS) of GSM, an IS-95 MS, a laptop computer having an SET function, Personal Digital Assistances (PDAs) or the like. The SET may also denote various mobile terminals which access through a Wideband LAN (WLAN).

The SET supports various procedures defined by the SUPL by being connected to the network through the user plane bearer. Here, a network that a user has originally registered is referred to as a home network. When a user moves and thus is located at another area which is not in the home network area, the corresponding area is referred to as a visited network. The SLP within the home network is called as a Home-SLP (H-SLP), and the SLP within the visited network is called as a Visited-SLP (V-SLP). Here, upon initiating a SUPL procedure at the network, an SLP to which an external client is initially connected is referred to as a Requesting SLP (R-SLP). The R-SLP is a logical entity which may be either the same as the H-SLP or not. In addition, a SET which is a target for a current positioning (i.e., location tracking) is defined as a target SET.

Furthermore, the SLP, as a network element, may include a SUPL Positioning Center (SPC) which is an entity for calculating an actual location, and a SUPL Location Center (SLC) which manages a function of the SLP other than calculating location (position) information, for example, functions of roaming and resource management. Therefore, the SET may calculate the position information (i.e., perform positioning) through a communication with the SPC via the SLC (i.e., proxy mode), and may calculate the position information (i.e., perform positioning) by being directly connected to the SPC (i.e., non-proxy mode).

The SUPL based immediate positioning method has been disclosed in the related art, however, area-based (area-related or area event trigged) positioning methods based upon the SUPL has not been proposed therein.

SUMMARY OF THE INVENTION

Therefore, an object of the present invention is to provide SUPL based area-related positioning (location tracking) methods which can variously efficiently be performed.

To achieve these and other advantages and in accordance with the purpose of the present invention, as embodied and broadly described herein, there is provided a positioning method in a mobile communications system according to a first embodiment comprising: sending a session initiating message including at least trigger type information to a target terminal; receiving a session-start message from the terminal; sending to the terminal a session response message including at least trigger parameter and a location identifier of a positioning-requested area; receiving a positioning initiating message from the terminal; performing positioning between the terminal and the location server and sending the position value calculated to the target terminal; and provisioning the position value to an agent when the corresponding position value of the target terminal is sent from the target terminal.

Preferably, the trigger type information denotes an area event service type.

Preferably, the trigger parameter(s) is a part of parameter(s) pertaining to the area event triggers.

Preferably, the location identifier corresponds to one of cell id(s) belonging to the positioning-requested area, Mobile Country Code (MCC), Mobile Network Code (MNC), Location Area Code (LAC), a scrambling code number, or a primary scrambling code number.

Preferably, the positioning initiating message is sent when a trigger condition matches.

Preferably, if the trigger condition included in the trigger parameter indicates that the terminal is moved into a specified area or positioned in the specified area, the position initiating message is sent only when at least one of the location identifiers received is identical with a current location identifier of the SET.

Preferably, if the trigger condition included in the trigger parameter indicates that the terminal is moved out of the specified area, the positioning initiating message is sent only when any of the location identifiers received is not identical with the current location identifier of the SET.

Preferably, the position value is sent to the terminal only when the position value calculated is identical with the position value of the specified area included in the trigger parameter.

An area-based positioning method in a mobile communications system according to a second embodiment of the present invention may comprise: receiving a session initiating message including first condition information from a location server in a terminal; starting a session with the location server according to the session initiating message; receiving a session response message including second condition information from the location server; sending a positioning initiating message to the location server; performing positioning (position calculation) between the location server and the terminal; comparing the position value of the terminal calculated with the second condition information to check whether the trigger condition is satisfied; and upon satisfying the trigger condition, sending the position value calculated to the location server.

Preferably, the first condition information denotes trigger type information, and the trigger type information denotes an area event service type.

Preferably, the second condition information includes at least a trigger parameter and a location identifier.

Preferably, the trigger parameter(s) is a part of parameter(s) pertaining to the area event triggers.

Preferably, the location identifier denotes an identifier of the positioning-requested area.

Preferably, the location identifier corresponds to one of cell id(s) belonging to the positioning-requested area, Mobile Country Code (MCC), Mobile Network Code (MNC), Location Area Code (LAC), a scrambling code number, or a primary scrambling code number.

Preferably, the positioning initiating message is sent when the trigger condition matches.

Preferably, if the trigger condition included in the trigger parameter indicates that the terminal is moved into a specified area or positioned in the specified area, the position initiating message is sent only when at least one of the location identifiers received is identical with a current location identifier of the SET.

Preferably, if the trigger condition included in the trigger parameter indicates checking whether the terminal is moved out of the specified area, the positioning initiating message is sent only when any of the location identifiers received is not identical with the current location identifier of the SET.

An area-based positioning method in a mobile communications system in accordance with a third embodiment of the present invention may comprise: receiving a session-start message including first and second condition information from a terminal; sending a session response message from a location server to the terminal; receiving a positioning initiating message sent from the terminal; and performing positioning between the terminal and the location server and then sending a position value calculated to the terminal.

Preferably, the first condition information denotes trigger type information, and the second condition information denotes a trigger parameter.

Preferably, the trigger type information denotes an area event service type.

Preferably, the trigger parameter(s) is a part of parameter(s) pertaining to the area event triggers.

Preferably, the session response message includes at least a location identifier of the positioning-requested area.

Preferably, the location identifier corresponds to one of cell id(s) belonging to the positioning-requested area, Mobile Country Code (MCC), Mobile Network Code (MNC), Location Area Code (LAC), a scrambling code number, or a primary scrambling code number.

Preferably, the positioning initiating message is sent when the trigger condition is satisfied.

An area-based positioning method in a mobile communications system in accordance with a third embodiment of the present invention may comprise: sending a session start message including at least first and second condition information to a location server; receiving a session response message from the location server; sending a positioning initiating message to the location server; performing positioning between the terminal and the location server; comparing a position value of the terminal calculated with at least the second condition information to check whether the trigger condition matches; and reporting the position value calculated to an inner agent when the trigger information is satisfied.

Preferably, the first condition information denotes a trigger type information, and the second condition information denotes a trigger parameter.

Preferably, the trigger type information denotes an area event service type.

Preferably, the trigger parameter(s) is a part of parameter(s) pertaining to the area event triggers.

Preferably, the location identifier corresponds to one of cell id(s) belonging to the positioning-requested area, Mobile Country Code (MCC), Mobile Network Code (MNC), Location Area Code (LAC), a scrambling code number, or a primary scrambling code number.

Preferably, the positioning initiating message is sent when a trigger condition matches.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Description will now be given in detail of the embodiments of the present invention, with reference to the accompanying drawings.

The present invention can be implemented in a SUPL network. However, the present invention may be employed to radio (wireless) communication systems which are operated based upon different specifications. Hereinafter, the preferred embodiments of the present invention will be explained.

The present invention provides a procedure for an area-based (area-related) positioning (location tracking) (e.g., when a terminal is moved into a specified area, positioned within the specified area, or moved out of the specified area) in case that a server and a terminal manage trigger information related to positioning in a SUPL based positioning (location/position information) system.

The area-based positioning according to the present invention can be illustrated such that when a corresponding event occurs periodically or according to pre-stored trigger information, an SLP or SET starts the positioning procedure to determine whether the SET is currently positioned in a corresponding area defined in the trigger information, namely, area event information, and accordingly, if it is determined that the SET is currently positioned in the corresponding area, the corresponding event is reported. Here, the area event denotes that it is verified that a terminal is moved into or out of a specified area, or positioned in the area, and thereby the corresponding event occurs. Also, the area corresponds to "specified area" presented in the present invention, which denotes information for defining the area event.

In general, location services provided in a SUPL based positioning system may classified into a service by a network (i.e., Network-initiated case) and a service by a SET (i.e., SET-initiated case). The location services may be classified into a proxy mode that the SET performs a positioning procedure by directly exchanging messages with a H-SLP of a home network, and a non-proxy mode that the SET performs the positioning procedure by exchanging messages with a SUPL Location Center (SLP) and a SUPL Positioning Center (SPC) within the H-SLP.

In the present invention, a periodic positioning is divided into a Network-trigged case or a SET-trigged case according to a subject managing trigger information. The divided cases will be re-classified into a service by a network (i.e., Network-initiated case and a service by the SET (i.e., SET-initiated case) to thusly be explained.

Figure 1:
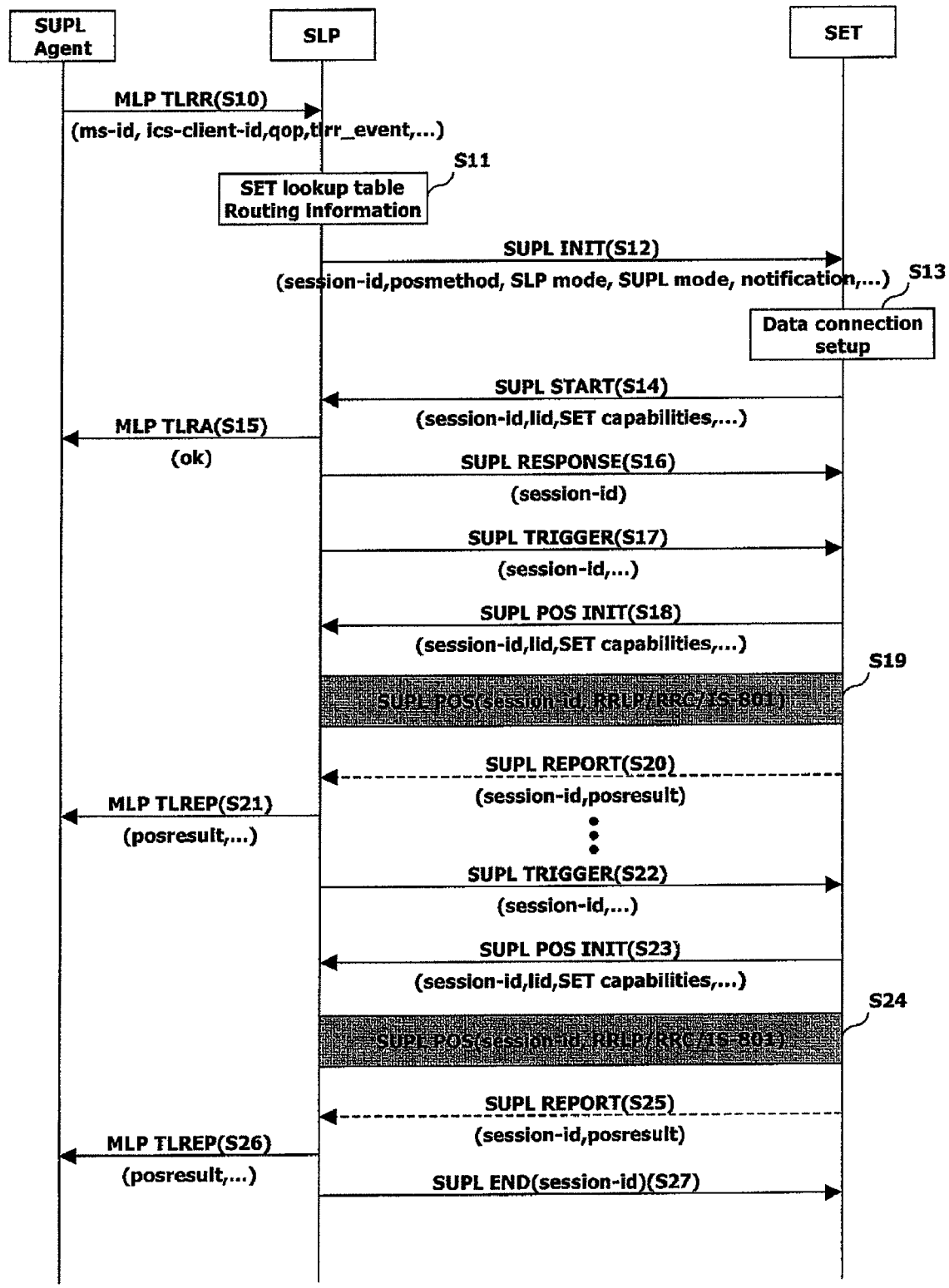
FIG. 1 is a view illustrating an area-based positioning procedure in accordance with a first embodiment of the present invention, which illustrates Network-trigged case and Network-initiated case for a Non-Roaming Proxy mode.

FIG. 1 is a view illustrating an area-based positioning procedure in accordance with a first embodiment of the present invention, which illustrates Network-trigged case and Network-initiated case for a Non-Roaming Proxy mode. Here, the SLP corresponds to a network side, while a target SET (referred to as SET hereafter) corresponds to a terminal side.

When an outer LCS client requests an area-based positioning, a SUPL agent requests the area-based positioning from the SLP using a Mobile Location Protocol (MLP) Trigged Location Reporting Request (TLRR) message (S10).

The MLP TLRR message may contain parameters such as ms-id, client-id, QoP, tlrr_event, and the like. ms-id denotes a target (SET) of which position is tracked, QoP denotes a positioning accuracy (e.g., a time delay and a spatial accuracy), and tlrr_event denotes area event information which is, namely, related to characteristics of the area-based positioning (e.g., whether the positioning target (e.g., a terminal) is moved into or out of a specified area, positioned in the specified area, or the like) and a specified area (e.g., a name of the specified area, an exact position value, or the like).

The MLP TLRR message may further include parameters related to types of the positioning values (which represent a current value or a value obtained in the latest time when it is difficult to calculate or obtain the current value), and parameters for setting priorities with respect to each positioning request for several positioning requests.

The SLP having received the MLP TLRR message verifies using a lookup table whether the target SET supports the SUPL, and verifies using routing information whether the target SET is currently SUPL roaming (S11).

If it is verified that the SET supports the SUPL and is currently not roaming, the SLP sends a SUPL initializing SUPL INIT message to the SET so as to start (initiate) the SUPL procedure with the SET (S12). Here, the SUPL INIT message may be sent in forms of a Wireless Application Protocol (WAP) push, a Short Message Service (SMS) trigger, a Session Initiation Protocol (SIP) push, UDP/IP, or the like, for example.

The SUPL INIT message may include at least session-id, SLP mode, SUPL mode, a positioning method (posmethod) to be used, and the like. Here, the SLP mode denotes an operation mode of the SLP (i.e., a Proxy mode or a Non-Proxy mode), the SUPL mode denotes types of positioning (e.g., an immediate positioning, a periodic positioning, area-based positioning, etc.). Also, the SLP confirms (verifies) a privacy of the SET prior to performing the step S11. If the user requires a notification related to location (position) information, the SLP further includes a notification parameter in the MLP TLRR message.

Hence, the SLP sends the SUPL INIT message by including area-based trigger information therein. This parameter may be used to inform the target SET of information related to the area-based positioning and of the corresponding positioning being executed by the SLP (i.e., Network-trigged case).

The SET having received the SUPL INIT message requests a data connection from a packet data network (i.e., 3GPP or 3GPP2) when any data connection is currently not set between the SET itself and a certain network (S13). Once setting the data connection, the SET stores the trigger information sent by the SUPL INIT message, and then sends a SUPL START message to the SLP (S14). Here, the SET sends SET capability information by including it in the SUPL START message.

The SLP sends acknowledgement (i.e., whether the positioning can be performed) with respect to the corresponding positioning request to the SUPL agent by using a MLP Trigged Location Reporting Answer (TLRA) message exchanged (S15). Thereafter, the SLP sends a SUPL RESPONSE message to the SET in response to the SUPL START message (S16). Here, the SUPL RESPONSE message may be replaced with a SUPL TRIGGER message. In this case, the step S16 is not performed.

Afterwards, in order to check using the stored trigger information whether the corresponding event has occurred, namely, in order to periodically check whether the position of the terminal corresponds to the position related to the event occurs, the SLP sends the SUPL TRIGGER message to the SET to thusly inform the SET of the positioning start (S17). The SET sends the SUPL positioning initializing SUPL POS INIT message to start an actual positioning related procedure (S18). Here, the SUPL POS INIT message may include at least Location Identifiers (lid) indicating a session ID, a base station ID, or the like, versions, SET capabilities, and the like.

The SLP and the SET consecutively exchange (send and receive) messages to execute an actual positioning, and then the SLP or SET calculates a position of the SET by virtue of the consecutive messages (S19). Preferably, the messages exchanged between the SLP and the SET may include a session ID, protocols (e.g., RRLP, RRC or TIA-801) to be used for the positioning, etc. Also, the SET does not accurately calculate the actual position value together with the SLP. Rather, the SET may report only the lid through a SUPL REPORT message.

The positioning (i.e., the position calculation) for the SET may be performed by the SLP based upon positioning measurements received from the SET (i.e., SET-assisted mode), or be performed by the SET based upon assistance obtained from the SLP (i.e., SET-based mode). The portion represented with a solid line in FIG. 1 illustrates the positioning by the SET-assisted mode. However, if the positioning is performed in the SET-based mode, the SET sends the calculated position value (i.e., posresult) to the SLP using the SUPL REPORT message (S20) (shown with dotted lines).

Upon completely performing the positioning (the position calculation), the SLP determines (verifies) whether the calculated position of the SET is identical with the pre-stored area event information. If it is determined that the position value of the SET is identical with the pre-stored area event information, the SLP sends the corresponding positioning value to the SUPL agent using a MLP TLREP message (S21). If not identical, the SLP periodically performs the positioning procedures as follows.

That is, in the succeeding area-based positioning period, the SLP sends the SUPL TRIGGER message to the SET to inform the positioning start (S22). The SET sends the SUPL POS INIT message to the SLP to start an actual positioning procedure (S23). Afterwards, the SLP and the SET consecutively exchange messages for performing the actual positioning with each other to thusly calculate the position of the SET (S24). Here, if the positioning (position calculation) is performed in the SET-based mode, the SLP receives the calculated position value from the SET by use of the SUPL REPORT message (S25). Also, the SET does not accurately calculate the actual position value together with the SLP. Rather, the SET may report only the location identifier (lid) through a SUPL REPORT message.

Accordingly, when completely checking up the position of the SET by the SUPL TRIGGER message, the SUPL POS INIT message, the SUPL POS procedure, and the SUPL REPORT message, the SLP determines again whether the position of the SET is identical with the pre-stored area event information. If it is determined the position value of the SET is identical with the pre-stored area event information (i.e., if the corresponding event occurs), the SLP sends the area-based positioning value to the SUPL agent through the MLP TLREP message (S26). The SLP then sends the SUPL END message to the SET to inform the termination of the SUPL procedure (or SUPL session) (S27). The SET having received the SUPL END message releases an IP connection with the SLP and releases all of the resources related to the positioning session.

On the other hand, the SUPL START and SUPL RESPONSE messages in FIG. 1 may be omitted. In this case, the MLP TLRA message can be sent after sending the SUPL POS INIT message.

For a long period for the area-based positioning, the location server may send a SUPL END message to the terminal at the end of every period to thusly end (terminate) the positioning for one period.

Figure 2:
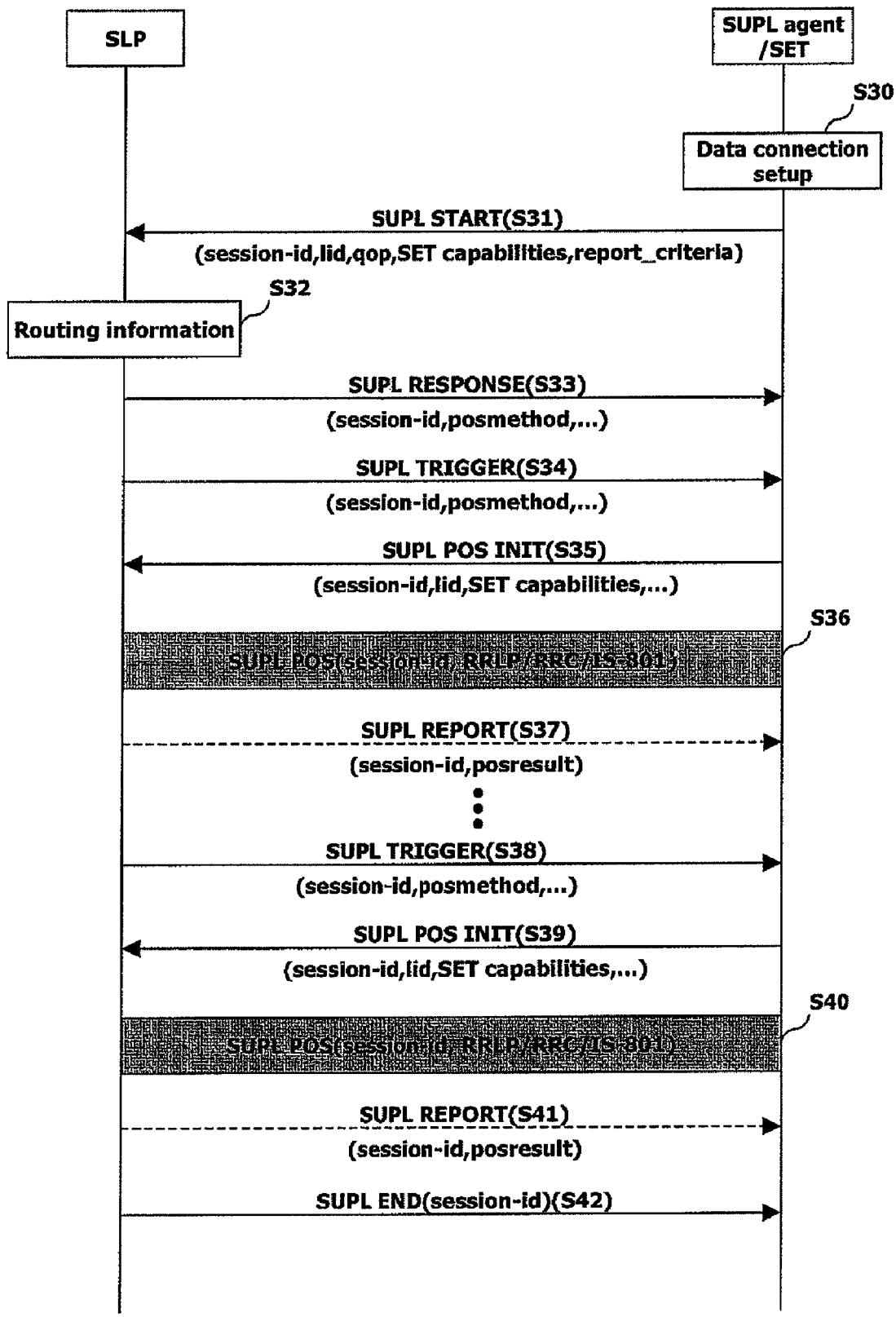
FIG. 2 is a view illustrating an area-based positioning procedure in accordance with a second embodiment of the present invention, which illustrates Network-trigged case and SET-initiated case for a Non-Roaming Proxy mode.

FIG. 2 is a view illustrating an area-based positioning procedure in accordance with a second embodiment of the present invention, which illustrates Network-trigged case and SET-initiated case for a Non-Roaming Proxy mode.

First, when a SUPL agent requests an area-based positioning, the SET requests a data connection from a packet data network (e.g., 3GPP or 3GPP2) when any data connection is not set between the SET itself and a certain network (S30).

Once setting the data connection, the SET sends a SUPL START message to the SLP to start a procedure for an area-based positioning (i.e., cases of moving into a specified area or out of the specified area) (S31). Here, the SET inserts (includes) a report_criteria parameter indicating area event information in the SUPL START message. Accordingly, the SET can send to the SLP characteristics of the area-based positioning (e.g., whether a positioning target (e.g., a terminal) is moved into or out of a specified area, positioned in the specified area, or the like) and information related to the specified area (e.g., a name of the specified area, an exact position value, or the like).

The SLP having received the SUPL START message stores the area event information, and verifies using routing information whether the SET is currently SUPL roaming (S32). If it is verified that the SET is currently not roaming, the SLP sends a SUPL RESPONSE message to the SET in response to the SUPL START message (S33).

Afterwards, in order to check using the stored trigger information whether the corresponding event has occurred, namely, in order to periodically check whether the position of the terminal corresponds to the position related to the event occurs, the SLP sends the SUPL TRIGGER message to the SET to thusly informs the SET of the positioning start (S34). The SET sends the SUPL positioning initializing (SUPL POS INIT) message to start (initiate) an actual positioning related procedure (S35). Here, if the positioning is initially generated, the SUPL TRIGGER message may be replaced with the SUPL RESPONSE message.

The SLP and the SET exchange consecutive messages for performing an actual positioning. The SLP or the SET may calculate the position of the SET by use of the consecutive messages (S36). Here, the SLP does not accurately calculate the actual position value together with the SET. Rather, the SLP may report only the lid through a SUPL REPORT message.

The positioning (i.e., position calculation) for the SET may be performed by the SLP using positioning measurements received from the SET (i.e., SET-assisted mode), or be performed by the SET using assistance obtained from the SLP (i.e., SET-based mode). The portion represented with a solid line in FIG. 1 illustrates the positioning by the SET-based mode. However, if the positioning is performed by the SET-assisted mode, the SLP sends the calculated position value to the SET using the SUPL REPORT message (S37) (shown with dotted lines). Upon completely performing the positioning, the SLP checks whether the calculated position for the SET is identical with the area event information stored to thereby determine whether the corresponding event has occurred.

In the succeeding positioning period, the SLP and the SET, as aforementioned, exchange the SUPL TRIGGER message, the SUPL POS INIT message, the SUPL POS procedure, and the SUPL REPORT message to re-perform the positioning (S38~S41). Here, instead of accurately calculating the actual position value between the SLP and the SET, the SLP may report only the lid using the SUPL REPORT message.

When completely performing the series of area-based positioning procedures, the SLP sends the SUPL END message to the SET to inform the SET of the termination of the SUPL procedure (or SUPL session) (S42). The SET then releases the IP connection with the SLP and also releases all of the resources related to the positioning session.

Figure 3:
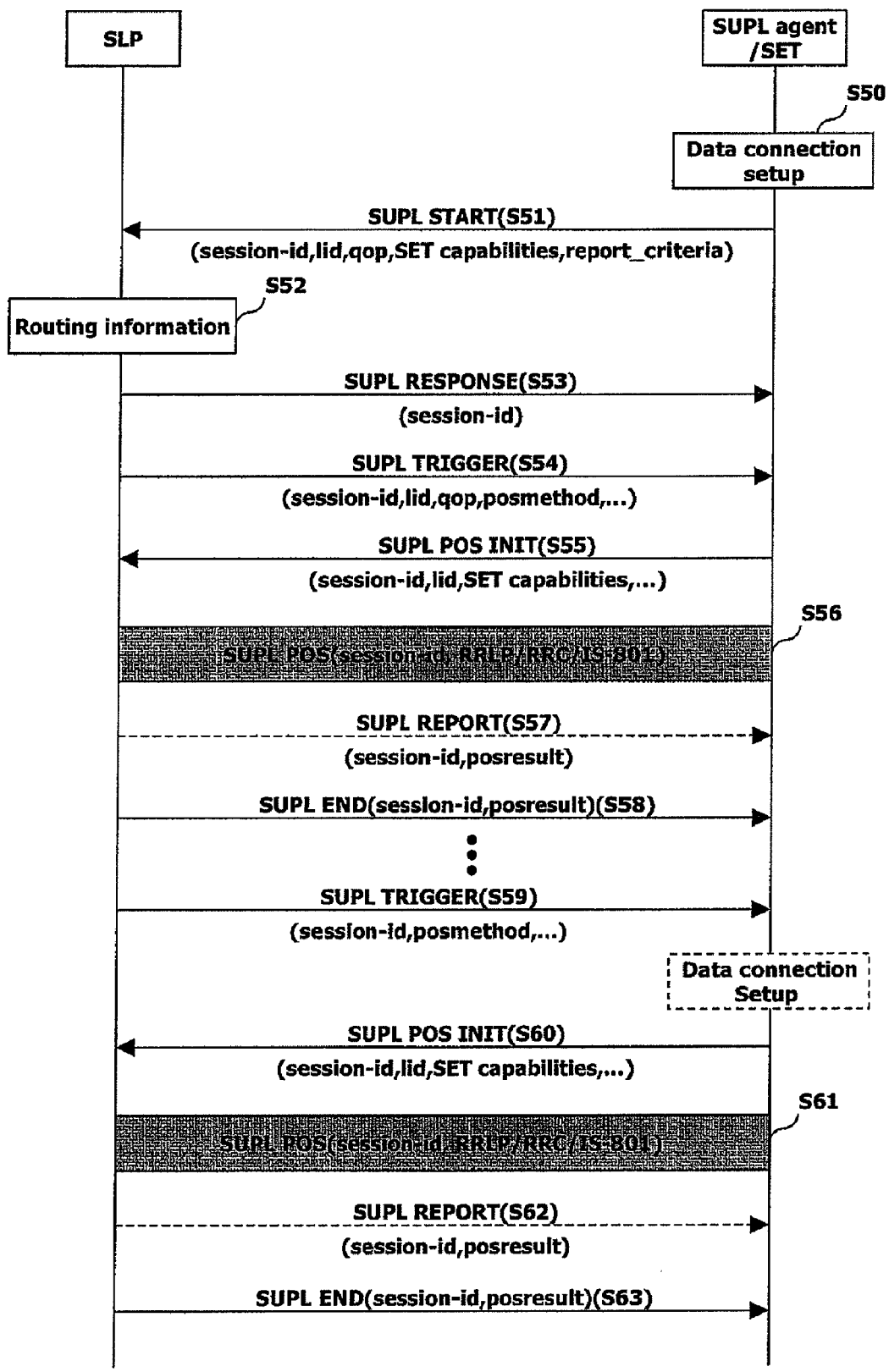
FIG. 3 is a view illustrating an area-based positioning procedure in accordance with a third embodiment of the present invention, which illustrates an area-based positioning period is relatively long as compared to that in the second embodiment.

FIG. 3 is a view illustrating an area-based positioning procedure in accordance with a third embodiment of the present invention, which illustrates an area-based positioning period is relatively long as compared to that in the second embodiment.

As illustrated in FIG. 3, for a long period for the area-based positioning, the SLP terminates positioning for one period at the end of every period using the SUPL END message (i.e., only the SUPL connection is released with maintaining the SUPL session) (S58). The SLP then performs positioning for the succeeding period reusing the SUPL TRIGGER message at the starting point of the succeeding period (S59). Here, the steps (S50~S57) are the same as the steps (S30~(S37) except their reference numerals, detailed explanation will not be repeated accordingly.

That is, when completely performing the area-based positioning procedure for one period (S57), the SLP sends the SUPL END message to the SET to thusly release the SUPL POS connection with respect to the one period (S58). Thereafter, the SLP sends the SUPL TRIGGER message to the SET so as to inform the SET of the positioning performance for the succeeding period (S59). Here, the SET requests a data connection from a packet data network (e.g., 3GPP or 3GPP2) when any data connection is not set between the SET itself and a certain network.

Accordingly, when the corresponding event occurs, the SLP and the SET exchange with each other the SUPL POS INIT message, the SUPL POS procedure, and the SUPL REPORT message to perform positioning for the corresponding period (S60~S62). When completely performing the series of area-based positioning procedures, the SLP sends the SUPL END message to the SET to thus inform the SET of the termination of the SUPL procedure (S63).

Figure 4:
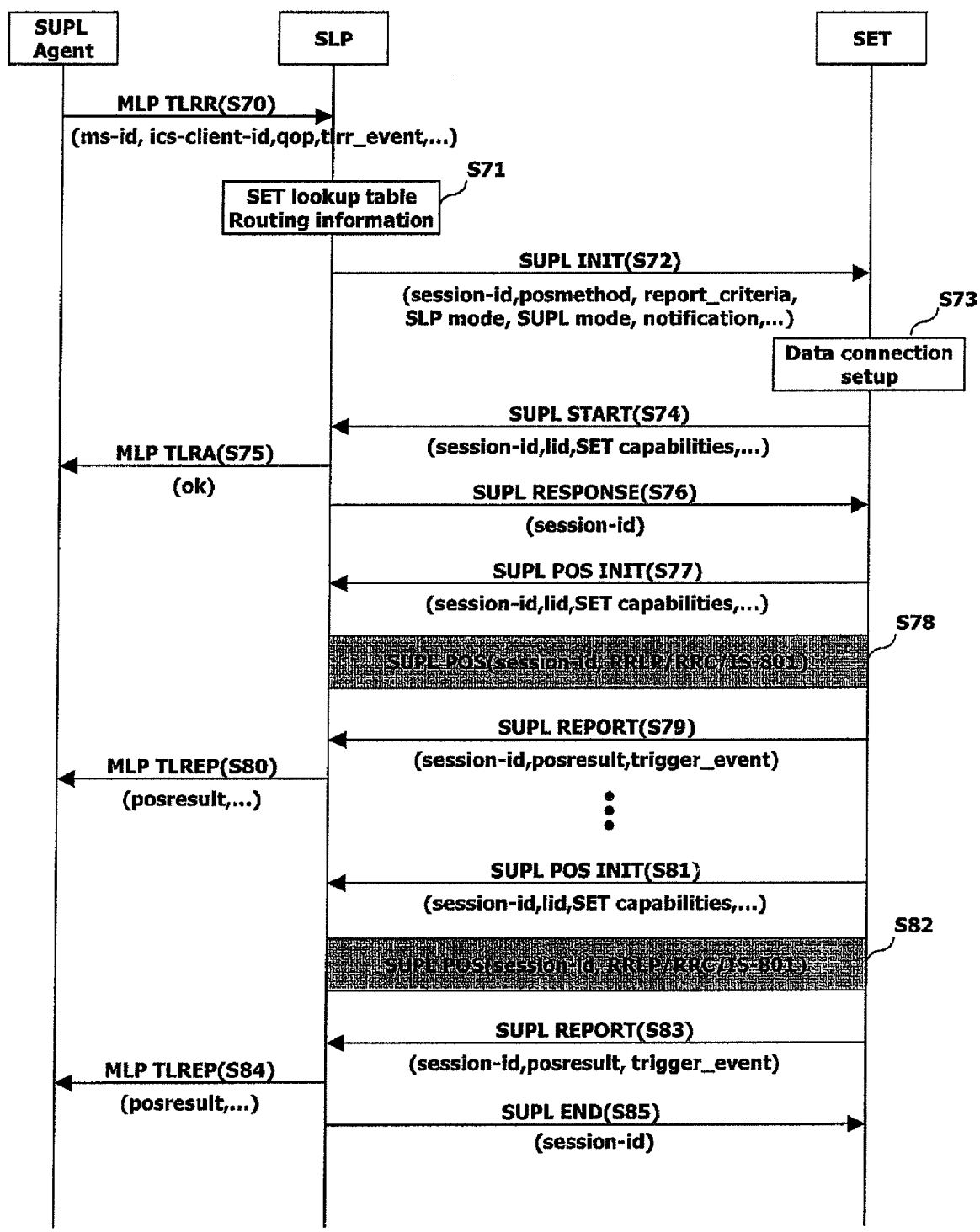
FIG. 4 is a view illustrating an area-based positioning procedure in accordance with a $4^{th}$ embodiment of the present invention, which illustrates SET-trigged case and Network-initiated case for a Non-Roaming Proxy mode.

FIG. 4 is a view illustrating an area-based positioning procedure in accordance with a $4^{th}$ embodiment of the present invention, which illustrates SET-trigged case and Network-initiated case for a Non-Roam Proxy mode, and particularly a case that the positioning is performed by the SET-based mode.

When an outer LCS client requests an area-based positioning, the SUPL agent requests the area-based positioning from the SLP using a Mobile Location Protocol (MLP) Trigged Location Reporting Request (TLRR) message (S70). The MLP TLRR message may contain parameters such as ms-id, client-id, QoP, tlrr_event, and the like. ms-id denotes a target object (SET) to be tracked, QoP denotes a positioning accuracy, and tlrr_event denotes area event information, namely, characteristics of the area-based positioning and a specified area. Also, the MLP TLRR message may further include parameters related to types of the positioning values, and parameters for setting priorities with respect to each positioning request for several positioning requests.

The SLP having received the MLP TLRR message verifies using a lookup table whether the SET supports the SUPL, and verifies using routing information whether the SET is currently SUPL roaming (S71). If it is verified that the SET supports the SUPL and is currently not roaming, the SLP sends a SUPL INIT message to the SET so as to start the SUPL procedure with the SET (S72). Here, the SUPL INIT message may be sent in forms of a WAP push, a Short Message Service (SMS) trigger, a Session Initiation Protocol (SIP) push, UDP/IP or the like, for example.

The SUPL INIT message may at least include parameters such as session-id, SLP mode, SUPL mode, posmethods, and the like. Here, the SLP mode denotes an operation mode of the SLP (e.g., Proxy mode or Non-Proxy mode), the SUPL mode denotes types of the positioning (e.g., immediate positioning, periodic positioning, and area-based positioning). The SLP can check privacy of the SET prior to performing the step S71. If a user requires a notification related to the positioning, a notification parameter may further be included in the SUPL INIT message.

The SLP includes a report_criteria parameter in the SUPL INIT message to send the SUPL INIT message. The SLP uses the report_criteria parameter to send trigger information related to the area-based positioning which has been received from the outer LCS client, namely, the area event information, to the SET. That is, the SLP forwards the trigger information generating the area-based positioning to the SET (i.e., SET-trigged case). The SET is accordingly allowed to perform an actual positioning when the corresponding event occurs.

The specified area (e.g., Seoul, or Shingil 1-dong) which has been sent from the SUPL agent using the MLP TLRR message is not actually represented as a cell id on a network. Accordingly, the SLP converts the specified area into a network parameter such as the cell id, or the like, if needed. The SLP then sends the converted network parameter using the SUPL INIT message. Alternatively, the SLP uses the SUPL INIT message to send the specified area name sent by the MLP TLRR message as it is. The converted into the network parameter which can be recognized by the SET may be sent through a separately provisioning protocol.

The SET having received the SUPL INIT message sets a data connection with a packet data network (e.g., 3GPP or 3GPP2) if any data connection is not set between the SET itself and a certain network (S73). Upon setting the data network, the SET stores the trigger information (i.e., area event information) sent by the SUPL INIT message and then sends a SUPL START message to the SLP (S74). Here, the SET also sends SET capability information by including it in the SUPL START message.

The SLP sends acknowledgement (i.e., whether the positioning can be performed) with respect to the corresponding positioning request to the SUPL agent by using a MLP TLRA message (S75). The SLP then sends a SUPL RESPONSE message to the SET in response to the SUPL START message (S76).

Afterwards, when requiring information (i.e., assistance data) periodically needed to calculate a position value by the SLP, for example, when requiring information transferred by the SLP so as to fast process data which should be measured for an actual positioning performed by the SET, the data, in case of using A-GPS, including a current orbit of a satellite, the number of satellites to which a satellite signal receivable by the terminal at its current position belongs, or the like, the SET sends the SUPL POS INIT message to the SLP to thusly start the positioning procedure (S77). Here, when a TCP/IP connection between the SET and the SLP has been released after sending the SUPL RESPONSE message, the SET must reset the data connection prior to sending the SUPL POS INIT message.

Therefore, the SLP and the SET consecutively exchange messages for performing the actual positioning (i.e., perform the SUPL POS procedure). Accordingly, the positioning (i.e., position calculation) for the SET may be performed by the SLP based upon positioning measurements received from the SET (i.e., SET-assisted mode), or be performed by the SET based upon assistance obtained from the SLP (i.e., SET-based mode).

FIG. 4 illustrates that the positioning is performed by the SET-based mode. Accordingly, when terminating the SUPL POS procedure, the SET compares the calculated position value with an actual position value set in the area event information thus to check whether the area event has occurred. If it is checked that the area event has occurred, the SET sends the calculated position value to the SLP using the SUPL REPORT message (S79). The SLP sends the positioning value received from the SET to the SUPL agent using a MLP TLREP message (S80). Here, the SET includes, in a trigger_event parameter of the SUPL REPORT message, information which indicates characteristics of the corresponding event (e.g., cases that the SET moves into a specified area or out of the area, or positioned within the specified area), to thereby send it to the SLP.

If it is checked that the area event has not occurred, on the other hand, the SET periodically performs the positioning procedures as follows. In this case, the steps S79 and S80 may not be performed.

That is, in the succeeding area-based positioning period, the SET sends the SUPL POS INIT message to the SLP to inform the SLP of the positioning start (S81). The SET consecutively exchanges messages with the SLP to thusly perform the positioning, thereby performing the SUPL POS procedure (S82).

Upon terminating the SUPL POS procedure, the SET compares the calculated position value with an actual position value set in the area event information. According to the comparison, if the calculated position value is identical with the actual position value (i.e. the area event has occurred), the SET sends the corresponding positioning value and the type of the event occurs to the SLP using the SUPL REPORT message (S83).

Accordingly, the SLP sends the positioning value received from the SET to the SUPL agent using the MLP TLREP message (S84). The SLP sends a SUPL END message to the SET thus to inform the SET of the end (termination) of the SUPL procedure (or SUPL session) (S85).

In FIG. 4, on the other hand, the SUPL START and SUPL RESPONSE messages may be omitted. In this case, the MLP TLRA message may be sent after sending the SUPL POS INIT message.

Figure 5:
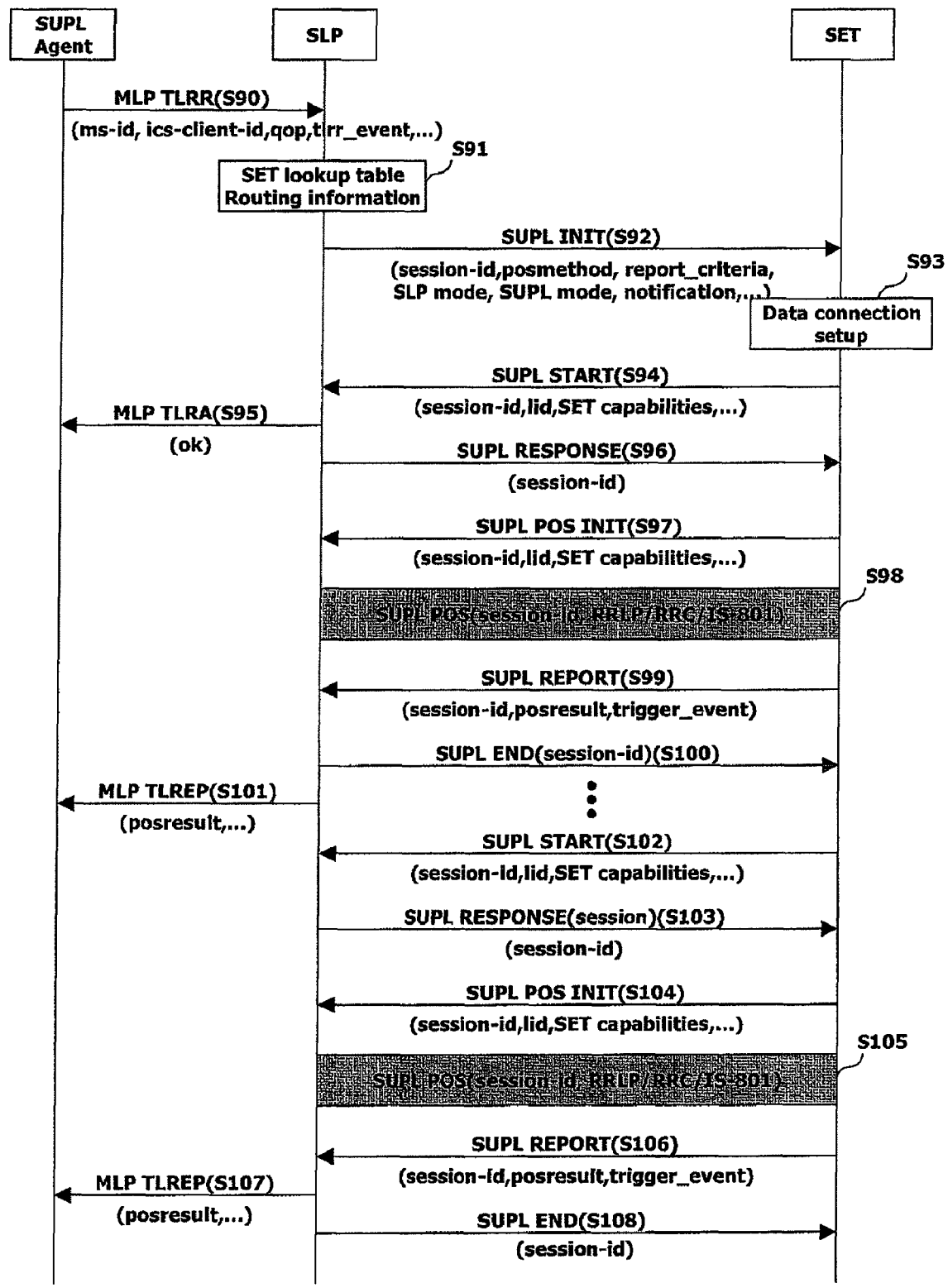
FIG. 5 is a view illustrating an area-based positioning procedure in accordance with a $5^{th}$ embodiment of the present invention, which illustrates an area-based positioning period is relatively long as compared to that in the fourth embodiment.

FIG. 5 is a view illustrating an area-based positioning procedure in accordance with a $5^{th}$ embodiment of the present invention, which illustrates an area-based positioning period is relatively long as compared to that in the fourth embodiment.

As illustrated in FIG. 5, when the area-based positioning procedure is performed by a long period, the SLP terminates the positioning for one period at the end of every period using the SUPL END message (i.e., the SUPL connection other than the SUPL session is released) (S100). The SLP then performs the positioning for the succeeding period reusing the SUPL START at the starting point of the succeeding period (S102). Here, the steps (S90~S99) are the same as the steps (S70~S79) except their reference numerals, detailed explanation will not be repeated accordingly.

That is, when terminating the area-based positioning procedure for one period to thereby occur an area event, the SLP sends the SUPL END message to the SET to thusly release the SUPL POS connection with respect to the one period (S100). Thereafter, the SLP sends the corresponding area-based positioning value to the SUPL agent using the MLP TLREP message (S101). If the area event has not occurred, the steps (S99 and S101) may not be performed.

Afterwards, in the succeeding area-based positioning period, the SET opens (connects) the released SUPL POS connection using the SUPL START message, and informs the SLP of the positioning for the succeeding period to be performed (S102). The SUPL START and SUPL RESPONSE messages may be omitted in FIG. 5. In this case, the MLP TLRA message may be sent after sending the SUPL POS INIT message. In the step S102, the SUPL START message may be replaced with the SUPL POS INIT message.

Accordingly, in the succeeding area-based positioning period, the SLP and the SET consecutively exchange with each other the SUPL POS INIT message, the SUPL POS procedure, and the SUPL REPORT AND MLP TLREP messages to perform the positioning, so as to send the corresponding position value to the SUPL agent (S104~S107). When the series of area-based positioning procedures are terminated, the SLP sends the SUPL END message to the SET so as to inform the SET of the end (termination) of the SUPL procedure (S108).

Figure 6:
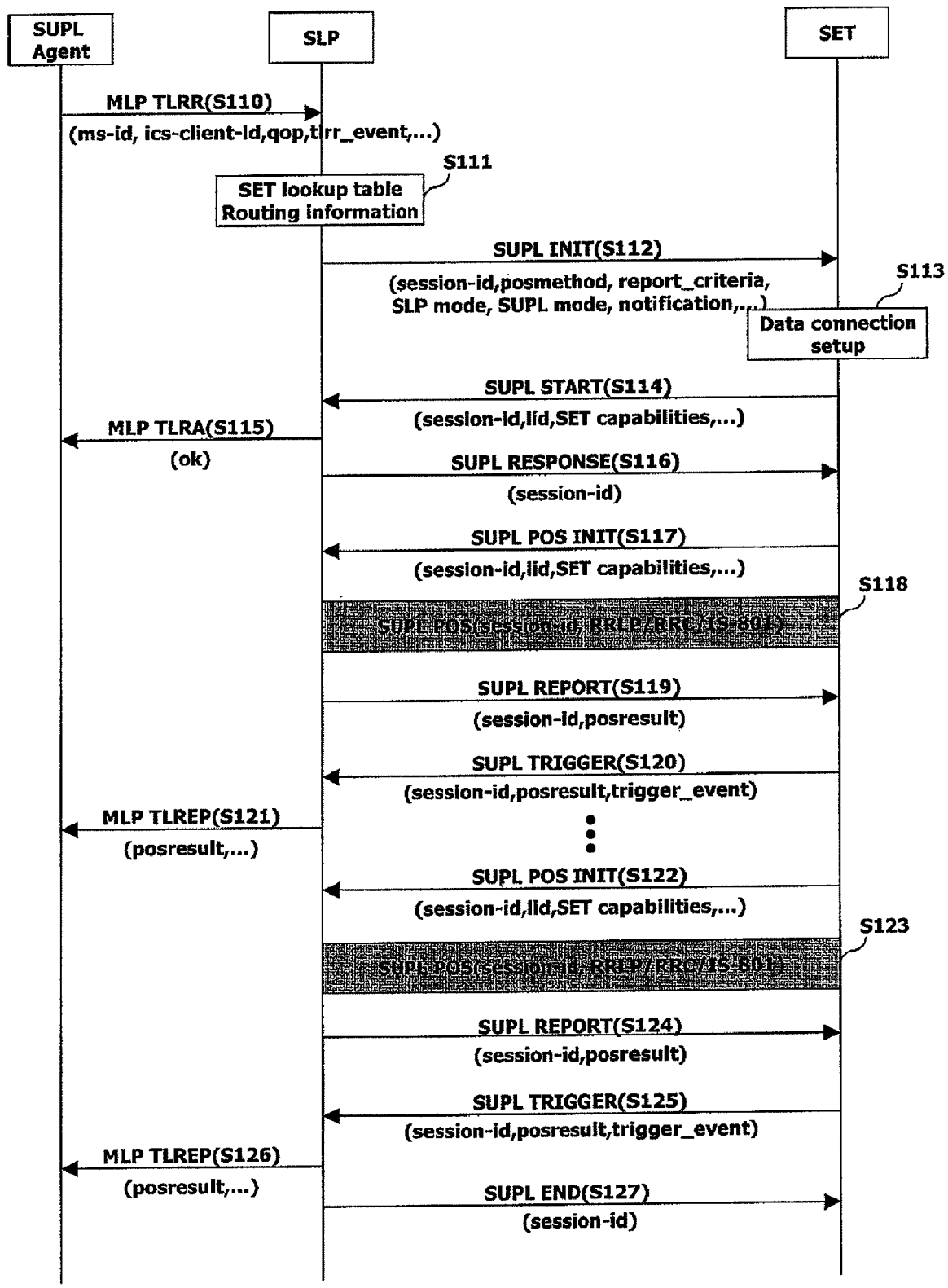
FIG. 6 is a view illustrating an area-based positioning procedure in accordance with a $6^{th}$ embodiment of the present invention, which illustrates SET-trigged case and Network-initiated case for a Non-Roaming Proxy mode.

FIG. 6 is a view illustrating an area-based positioning procedure in accordance with a 6$^{th}$ embodiment of the present invention, which illustrates SET-trigged case and Network-initiated case for a Non-Roaming Proxy mode, and particularly a case that the positioning is performed by the SET-assisted mode.

As illustrated in FIG. 6, the operations performed by the steps (S110~S118) are the same as those performed by the steps (S70~S78) of FIG. 4, detailed explanation will be omitted accordingly.

Hence, upon ending (terminating) the SUPL POS procedure (S118), the SLP sends the calculated position value to the SET using the SUPL REPORT message (S119). The SET compares the calculated position value with an actual position value set in the area event information thus to check whether the area event has occurred. If it is checked that the area event has occurred, the SET includes the calculated position value and a trigger_event parameter indicating a characteristic of the corresponding event in the SUPL TRIGGER message. The SET thereafter sends the SUPL TRIGGER message to the SLP (S120). The SLP then sends the positioning value received from the SET to the SUPL agent using the MLP TLREP message (S121).

If it is checked that the area event has not occurred, on the other hand, the SET periodically performs the positioning procedure as follows. In this case, the steps S120 and S121 may not be performed.

That is, in the succeeding area-based positioning period, the SET re-sends the SUPL POS INIT message to the SLP to thusly inform the SLP of the positioning start (S122). The SET then exchanges consecutive messages for performing an actual positioning with the SLP and accordingly performs the SUPL POS procedure (S123).

When ending (terminating) the SUPL POS procedure, the SLP sends the calculated position value to the SET using the SUPL REPORT message (S124). The SET then compares the calculated position value with an actual position value set in the area event information to thereby check whether the area event has occurred. If it is checked that the area event has occurred, the SET includes the calculated position value and a trigger_event parameter indicating characteristics of the corresponding event in the SUPL TRIGGER message and sends the SUPL TRIGGER message to the SLP (S125).

Hence, the SLP sends the positioning value received from the SET to the SUPL agent using the MLP TLREP message (S126). The SLP then sends the SUPL END message to the SET so as to inform the SET of the termination of the SUPL procedure (or SUPL session) (S127).

The SUPL START and SUPL RESPONSE messages, on the other hand, may be omitted in FIG. 6. In this case, the MLP TLRA message may be sent after sending the SUPL POS INIT message.

Figure 7:
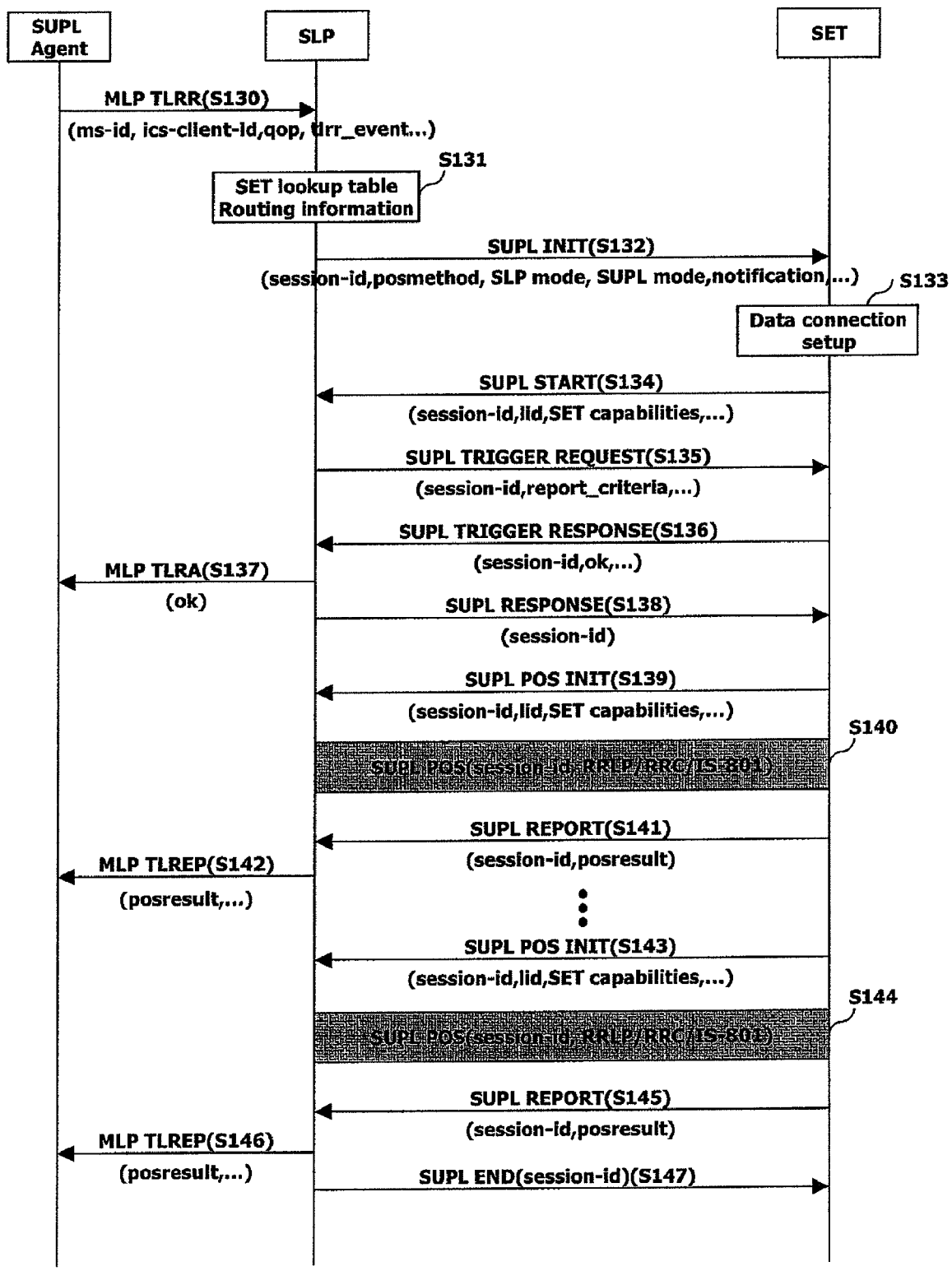
FIG. 7 is a view illustrating an area-based positioning procedure in accordance with a $7^{th}$ embodiment of the present invention, which illustrates a procedure for sending area trigger information to a mobile communications terminal using a new message.

FIG. 7 is a view illustrating an area-based positioning procedure in accordance with a 7$^{th}$ embodiment of the present invention. The seventh embodiment illustrates an example that the SLP sends a report_criteria using a new SUPL TRIGGER REQUEST message when the SLP can not send the report_criteria using the SUPL INIT message due to a limitation on the size of the SUPL INIT message.

That is, the seventh embodiment of the present invention is different from the 4$^{th}$ embodiment in view of the addition of SUPL TRIGGER REQUEST and SUPL TRIGGER RESPONSE message. Other steps are the same as the steps in the 4$^{th}$ embodiment except their reference numerals.

Therefore, upon performing the steps (S130~5134) aforementioned, the SLP sends trigger information (i.e., area event information) for the area-based positioning to the SET using the SUPL TRIGGER REQUEST message (S135), so as to make the SET arrange the area-based positioning according to the corresponding information and to allow the SET to separately perform a user confirmation. The SET stores the area event information sent by the SUPL TRIGGER REQUEST message and thereafter sends a SUPL TRIGGER RESPONSE message in response to the SUPL TRIGGER REQUEST message (136).

However, unlike in FIG. 4, as illustrated in FIG. 7, the SLP receives the SUPL TRIGGER RESPONSE message from the SET and then sends the MLP TLRA message to the SUPL agent (S137). Since the SLP sends to the SET the SUPL TRIGGER REQUEST message which includes the trigger information related to the area-based positioning, and then receives from the SET the SUPL TRIGGER RESPONSE message in response to the SUPL TRIGGER REQUEST message, only the reception of the SUPL TRIGGER RESPONSE message can inform that the trigger information related to the area-based positioning has completely sent to the SET. However, the SUPL TRIGGER RESPONSE message can be omitted. In this case, the SLP sends the SUPL TRIGGER REQUEST message and then immediately sends the MLP TLRA message to the SUPL agent.

The SUPL INIT message can be sent in a SMS sending manner. Accordingly, when the report_criteria parameter can not be all included in the SMS, the SUPL TRIGGER REQUEST message may denote a message for separately sending the report_criteria parameter, and the SUPL TRIGGER RESPONSE message corresponds to a message in response to the SUPL TRIGGER REQUEST message. Therefore, both the SUPL START message and the SUPL RESPONSE message could be omitted in FIG. 4. In FIG. 7, however, for sending the trigger information related to the are-based positioning by the SUPL TRIGGER REQUEST message and receiving the SUPL TRIGGER RESPONSE, the SET must first send the SUPL START message to the SLP to obtain an acceptance from the SLP with respect to the periodic positioning included in the SUPL INIT. Accordingly, only the SUPL RESPONSE message may be omitted.

Even in the seventh embodiment of the present invention, for the long period for the are-based positioning, a procedure can be changed so as to be able to open (connect) the SUPL session by the SET per every period. In this case, the SUPL START message and the SUPL RESPONSE message are added for every positioning period prior to sending the SUPL POS INIT message. If the SUPL REPORT message is not used (required, sent), the SUPL END message is added following every SUPL POS procedure. If the SUPL REPORT message is used, the SUPL END message is added following the SUPL REPORT message.

FIGS. 5 and 7 illustrate that the positioning (i.e., position calculation) is performed only by the Set-based mode. If the positioning is performed by the SET-assisted mode, as shown in FIG. 6, the SLP sends the calculated position value to the SET using the SUPL REPORT message, and the SET checks whether the corresponding event has occurred. When the corresponding event has occurred, the SET informs the SLP using the SUPL TRIGGER message that the corresponding event has occurred.

Figure 8:
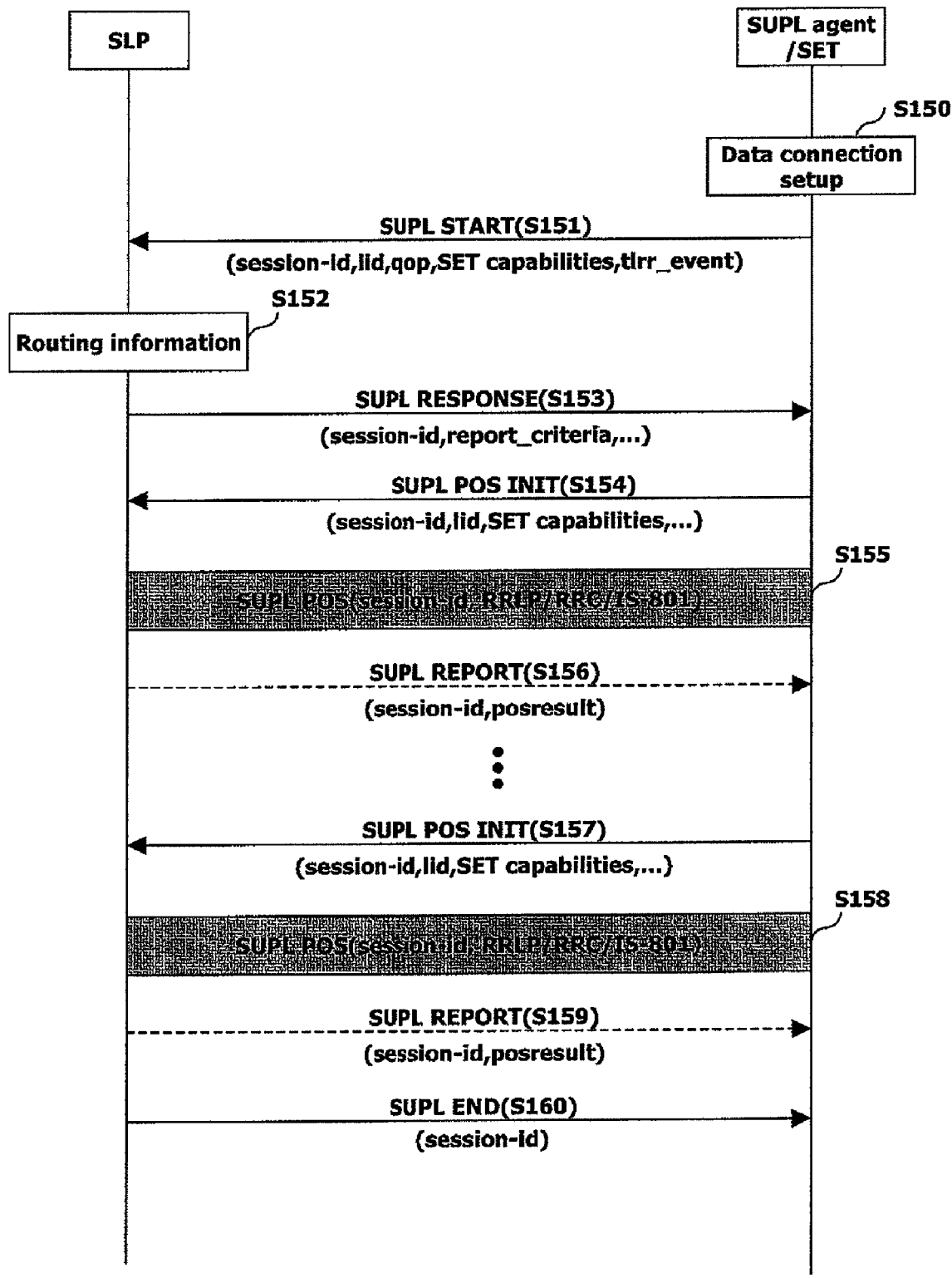
FIG. 8 is a view illustrating an area-based positioning procedure in accordance with an $8^{th}$ embodiment of the present invention, which illustrates SET-trigged case and SET-initiated case for a Non-Roaming Proxy mode.

FIG. 8 is a view illustrating an area-based positioning procedure in accordance with an $8^{th}$ embodiment of the present invention, which illustrates SET-trigged case and SET-initiated case for a Non-Roaming Proxy mode.

First, when the SUPL agent requests the area-based positioning, the SET requests a data connection from a packet data network (e.g., 3GPP or 3GPP2) if any data connection is not set between the SET itself and a certain network (S150).

Once setting the data connection, the SET sends the SUPL START message to the SLP to start the area-based positioning procedure (S151). Here, the SET inserts (includes) a tlr-r_event parameter in the SUPL START message to set characteristics of the area-based positioning, specified area related information, and the like, and then sends the SUPL START message to the SLP.

For example, the specified area related information may be a name of an area in an administrative district or a name of a well-known area, such as "Seoul", "Shingil 1-dong". The specified area related information is represented by information with latitude/longitude or coordinates x, y and z, and the like. Accordingly, the SET must send the specified area related information and/or the specific position information thus to receive from the SLP the network parameter (e.g., cell id) by which the SET can recognize its movement to the corresponding area. This is why only the SLP knows the cell ids configuring the area associated with the area-based positioning.

The SLP having received the SUPL START message verifies using routing information whether the SET is currently SUPL roaming (S152). If the SET is currently not roaming, the SLP sends the SUPL RESPONSE message to the SET in response to the SUPL START message (S153).

The SLP sends the SUPL RESPONSE message by including the report_criteria parameter therein. The SLP includes trigger information related to an area-based positioning request received from the SET, and then sends it to the SET. That is, the SLP forwards the trigger information generating the area-based positioning to the SET, so as to allow the SET to perform the actual area-based positioning procedure when the corresponding event occurs (i.e., SET-triggered). For example, for a positioning related to a specified area, the specified area-related information (e.g., Seoul or Shingil 1-dong) received from the SET is not indicated by use of a cell id, or the like on an actual network. Accordingly, the SLP converts the corresponding area into a network parameter such as the cell id or the like to thereafter send it to the SET. Also, the value converted into the network parameter which can be recognized by the SET may be sent using a separate provisioning protocol as well as the SUPL RESPONSE.

In the area-based positioning period, the SET sends the SUPL POS INIT message to the SLP to start the area-based positioning procedure (S154). Here, when a TCP/IP connection between the SLP and the SET is released after sending the SUPL RESPONSE message, the SET must reset the data connection prior to sending the SUPL POS INIT message.

The SET consecutively exchanges messages for performing an actual positioning with the SLP thus to perform the SUPL POS procedure, thereby calculating the position of the SET (S155). Here, the positioning (i.e., position calculation) for the SET may be performed by the SLP based upon positioning measurements received from the SET (i.e., SET-assisted mode), or be performed by the SET based upon assistance obtained from the SLP (i.e., SET-based mode). FIG. 8 illustrates the positioning performed by the SET-based mode. However, if the positioning is performed by the SET-assisted mode, the SLP sends the calculated position value to the SET using the SUPL REPORT message (S156).

Accordingly, the SET determines whether the calculated position value is identical with the area event information (e.g., cell id) provisioned from the SLP to thereby check whether the area event has occurred. If it is checked that the area event has occurred, the SET provisions the calculated position value to the SUPL agent.

Afterwards, in the succeeding positioning period, the SLP and the SET, as aforementioned, perform the positioning for the corresponding period using the SUPL POS INIT message, the SUPL POS procedure, and the SUPL REPORT message so as to calculate the position value of the SET (S157~S159): Upon completely performed the series of area-based positioning procedures, the SLP sends the SUPL END message to the SET to inform the SET of the termination (end) of the SUPL procedure (S160). The SET then releases an IP connection with the SLP and also releases all of the resources related to the positioning session.

Figure 9:
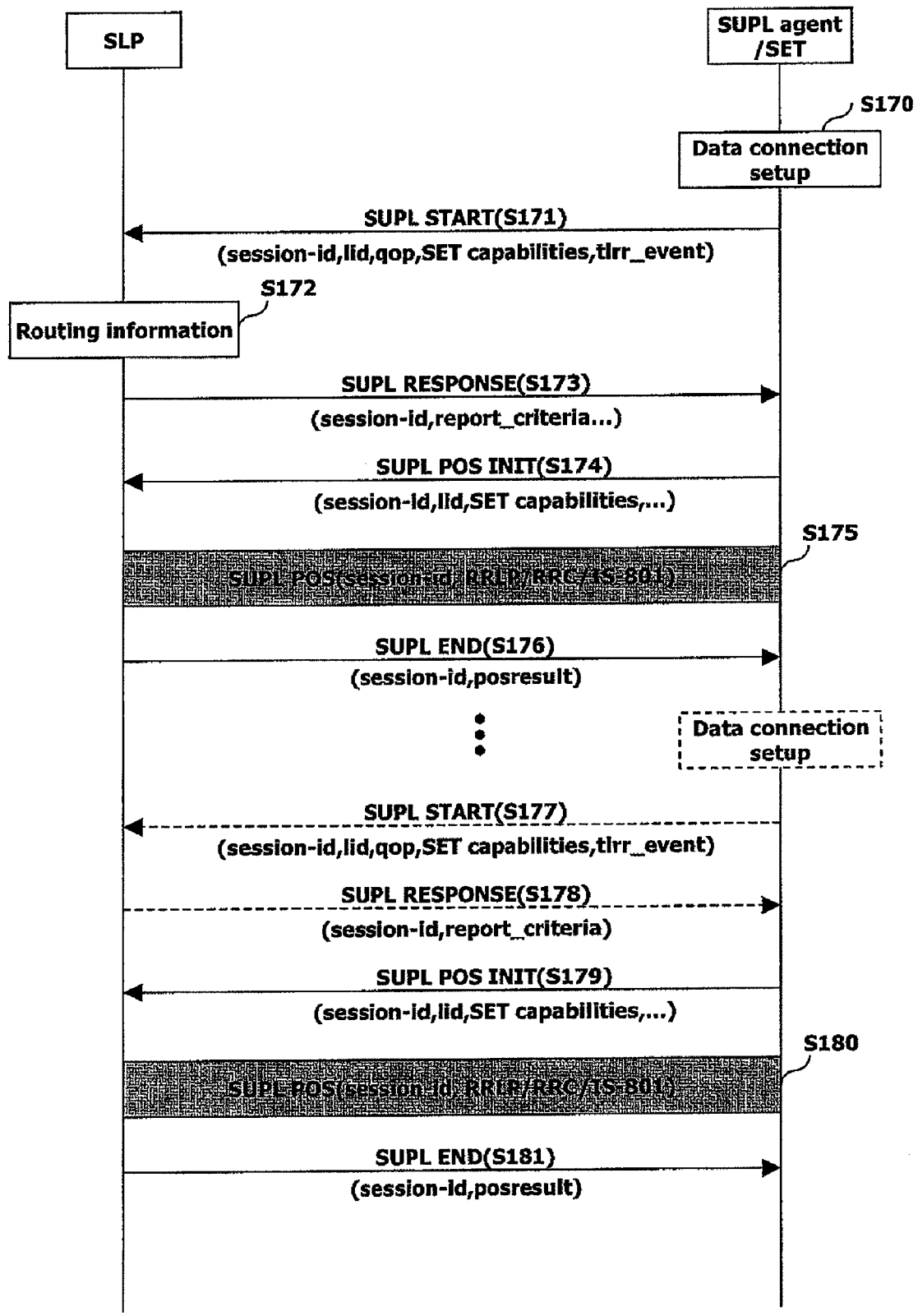
FIG. 9 is a view illustrating an area-based positioning procedure in accordance with a $9^{th}$ embodiment of the present invention, which illustrates an area-based positioning period is relatively long as compared to that in the $8^{th}$ embodiment.

FIG. 9 is a view illustrating an area-based positioning procedure in accordance with a $9^{th}$ embodiment of the present invention, which illustrates an area-based positioning period is relatively long as compared to that in the $8^{th}$ embodiment.

That is, if the area-based positioning is performed by a long period, the location server sends the SUPL END message to the terminal at the end of every period, and terminates the positioning for one period (S176). Here, when the positioning for one period is terminated and the positioning for the next period is started, the SET informs the SLP of the start of the area-based positioning for the second period using the SUPL START message (S177). Here, the SUPL START message sent from the second period may include a period value (e.g., the number of times) decreased as much as the previous period value.

Accordingly, the $9^{th}$ embodiment of the present invention is different from the $8^{th}$ embodiment in view of the step in which the SET sends the SUPL START message to the SLP for every positioning period after performing the step S177 to thereby start the area-based positioning procedure. Other steps except the step in the $9^{th}$ embodiment are the same as the steps in the $8^{th}$ embodiment except their different reference numerals therefrom, detailed explanation of which will not be repeated accordingly.

As aforementioned, in order to check whether the area event has occurred, it is necessary to calculate a current position of the SET. However, if the SET is located far away from an area defined in the trigger information (area event information), a periodic positioning session between the SET and the SLP is not so important. In this case, the area event can be processed through the coarse positioning for the SET until the SET approaches a target area.

Accordingly, if the coarse positioning is performed using the cell-id, an area-based positioning service can basically be configured with three stages as follows.

1) A plurality of cell-ids of a specified area are sent to the SET.
2) The plurality of cell-ids sent are compared with a cell-id in which a target SET is currently positioned.
3) If one of the cell-ids is identical with the cell-id in which the target SET is currently positioned, the SET periodically starts a positioning session. Here, FIGS. 10 through 13 will now be explained based upon these points of view.

Figure 10:
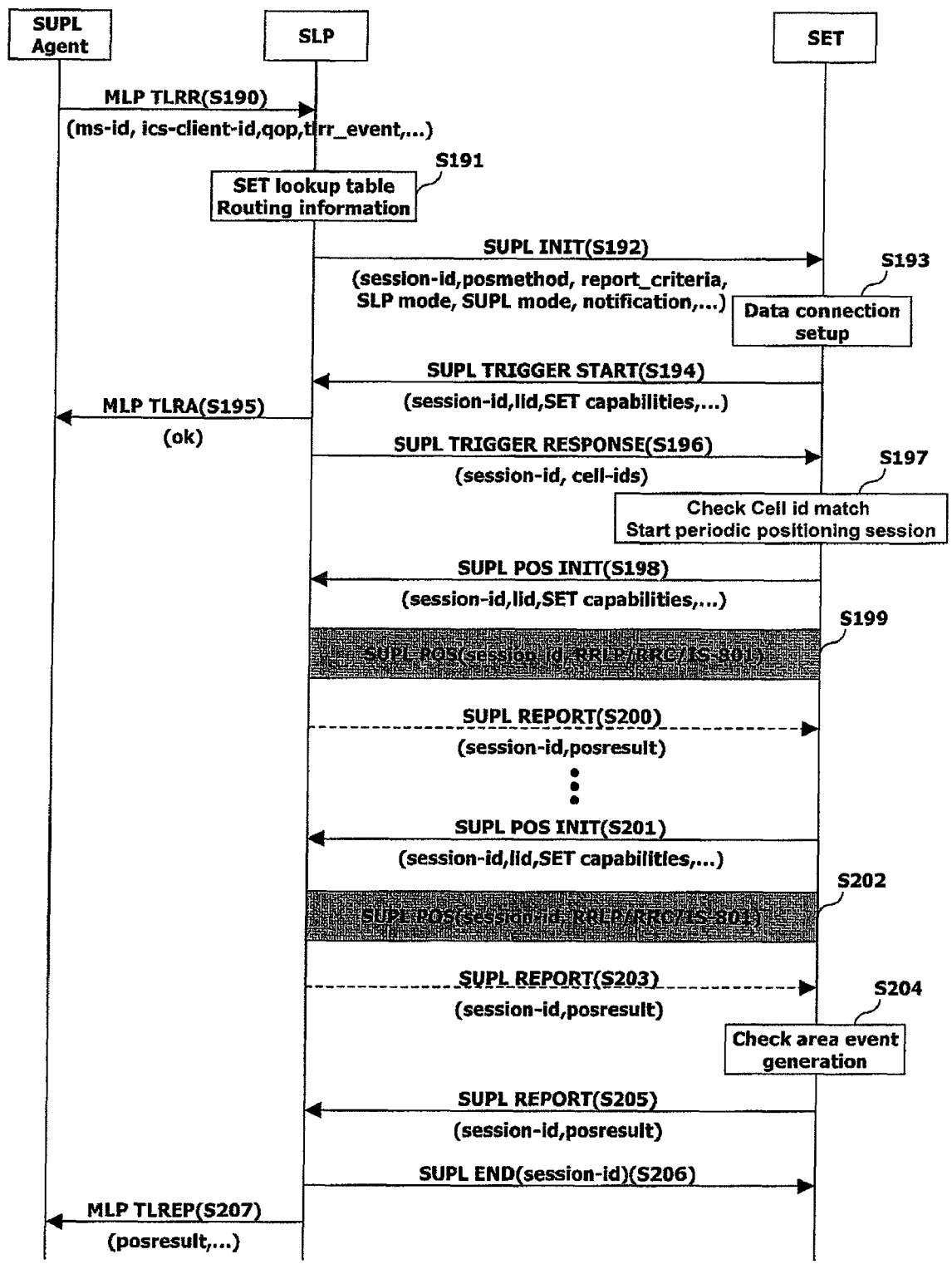
FIG. 10 is a view illustrating an area-based positioning procedure in accordance with a $10^{th}$ embodiment of the present invention, which illustrates SET-trigged case and Network-initiated case for a Non-Roaming Proxy mode.

FIG. 10 is a view illustrating an area-based positioning procedure in accordance with a $10^{th}$ embodiment of the present invention, which illustrates SET-trigged case and Network-initiated case for a Non-Roaming Proxy mode. The $10^{th}$ embodiment of the present invention illustrates such that the positioning (i.e., position calculation) for the SET is approximately performed using the cell-id, and thereafter a periodic area-based positioning is performed only when the calculated position of the SET corresponds to a position defined in area event information. Here, the SLP corresponds to a home network side, and the SET corresponds to a terminal side.

As illustrated in FIG. 10, when an outer LCS client requests an area-based positioning, the SUPL agent requests the area-based positioning from the SLP using a MLP TLRR message (S190). The MLP TLRR message includes parameters such as ms-id, client-id, QoP, tlrr_event, and the like. Here, ms-id denotes a target to be position-tracked, QoP denotes a positioning accuracy, and tlrr_event denotes area event information, namely, characteristics of an area-based positioning and a specified area.

The SLP having received the MLP TLRR message verifies using a lookup table whether the SET supports the SUPL, and then verifies whether the SET is currently SUPL roaming (S191). If it is verified that the SET supports the SUPL and is currently not roaming, the SLP sends a SUPL INIT message to the SET to start the SUPL procedure with the SET (S192). Here, the SUPL INIT message may be sent in forms of WAP Push, SMS trigger, SIP Push, UDP/IP, or the like.

The SUPL INIT message may at least includes parameters such as session-id, SLP mode, SUPL mode, posmethod, and the like. Here, the SLP mode denotes an operation mode of the SLP (i.e., a Proxy mode or a Non-Proxy mode), the SUPL mode denotes types of positioning (e.g., an immediate positioning, a periodic positioning, area-based positioning, etc. Also, the SLP sends the SUPL INIT message by including a report_criteria parameter therein. The SLP uses the report_criteria parameter to send trigger information related to the area-based positioning which has been received from the outer LCS client, namely, the area event information, to the SET. That is, the SLP forwards the trigger information generating the area-based positioning to the SET. The SET is accordingly allowed to perform an actual positioning when the corresponding event occurs.

The SET having received the SUPL INIT message sets a data connection with a packet data network (e.g., 3GPP or 3GPP2) when any data connection is not set between the SET itself and a certain network (S193).

Upon setting the data connection, the SET stores the area event information sent by the SUPL INIT message, and sends a SUPL TRIGGER START message which includes session-id, lid and SET capability information to the SLP (S194).

The SLP having received the SUPL TRIGGER START message sends acknowledgement for the positioning request to the SUPL agent through the MLP TLRA message (S195). The SLP then determines which cells belong to the specified area requested by the SUPL agent. The SLP stores the cell id corresponding to the determined cells and also sends the cell ids to the SET using a SUPL TRIGGER RESPONSE message (S196).

The SET having received the plurality of cell ids through the SUPL TRIGGER RESPONSE message compares the plurality of cell-ids with a cell id in which the SET is currently positioned to check whether there is a cell id which is identical with the cell id of the SET (S197). The comparison is executed to check whether the SET has approached to the target area by an approximate positioning (i.e., position calculation) for the SET.

According to the comparison, if one of the plurality of cell ids is identical with the cell id of the current SET, the SET recognizes that it has approached the target area, and starts a periodic area-based positioning. That is, the SET sends the SUPL POS INIT message to the SLP at the area-based positioning period to start the area-based positioning procedure (S198).

Accordingly, the SET and the SLP consecutively exchange messages with each other for performing an actual positioning thus to perform the SUPL POS procedure, thereby calculating the position of the SET (S199). Here, the positioning (i.e., position calculation) for the SET may be performed by the SLP based upon positioning measurements received from the SET (i.e., SET-assisted mode), or be performed by the SET based upon assistance obtained from the SLP (SET-based mode). FIG. 10 illustrates the positioning performed by the SET-based mode. However, if the positioning is performed by the SET-assisted mode, the SLP sends the calculated position value to the SET using the SUPL REPORT message (S200).

Upon obtaining the position value of the SET, the SET compares the obtained position value with an actual position value set in the area event information and checks whether the area event has occurred. If it is checked the area event has not occurred, the steps S201 and S202 are re-performed to calculate a new position value. Here, if the positioning is performed by the SET assisted mode, the SLP sends the calculated position value to the SET using the SUPL REPORT message (S203).

Afterwards, the SET re-compares again the newly calculated position value with the actual position value set in the area event information. If the two position values are identical with each other to thusly occur the area event (S204), the SET sends the newly calculated position value (i.e., positioning value) to the SLP using the SUPL REPORT message (S205). Accordingly, the SLP sends the SUPL END message to the SET to terminate the SUPL session (S206). The SLP then sends the positioning value received from the SET to the SUPL agent using the MLP TLREP message (S207).

Figure 11:
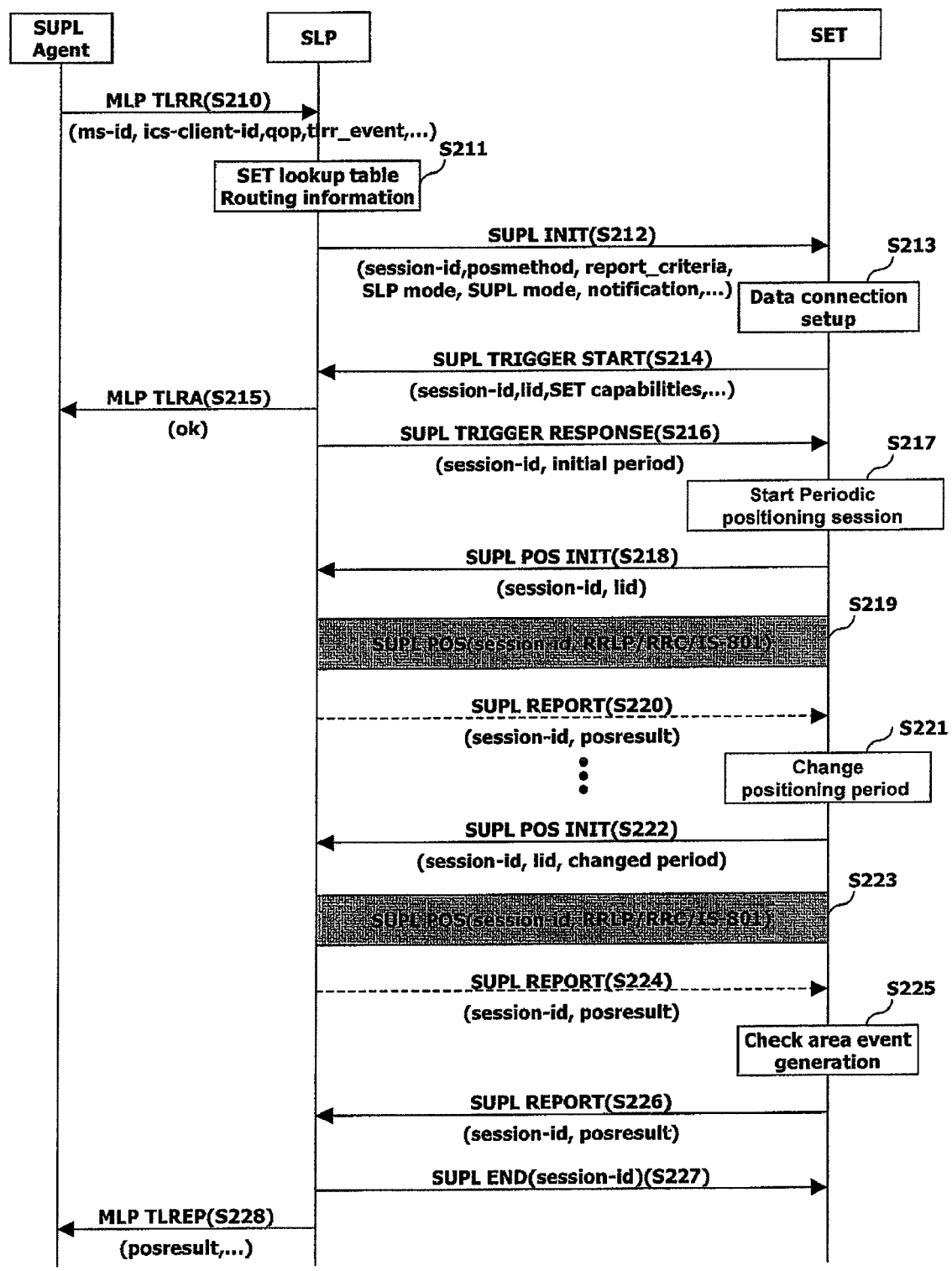
FIG. 11 is a view illustrating an area-based positioning procedure in accordance with a $11^{th}$ embodiment of the present invention, which illustrates SET-trigged case and Network-initiated case for a Non-Roaming Proxy mode.

FIG. 11 is a view illustrating an area-based positioning procedure in accordance with an $11^{th}$ embodiment of the present invention, which illustrates SET-trigged case and Network-initiated case for a Non-Roaming Proxy mode. The $11^{th}$ embodiment of the present invention illustrates such that the SLP calculates initial period information for the area-based positioning to send the calculated initial period information to the SET, and the SET performs the positioning according to the initial period information to thereafter change the initial period information according to the position of the SET.

As illustrated in FIG. 11, operations performed by the steps S210 through S213 are the same as the operations performed by the steps S190 through S193 in FIG. 10, detailed explanation of which will not be repeated accordingly.

Once setting the data connection (S213), the SET stores the area event information sent by the SUPL INIT message, and sends the SUPL TRIGGER START message including session-id, lid and SET capability information to the SLP (S214).

The SLP having received the SUPL TRIGGER START message sends acknowledgement for the position request to the SUPL agent by use of the MLP TLRA message (S215). The SLP then calculates a relative distance between the specified area requested by the SUPL agent and a current position of the SET (i.e., a position approximately estimated by using the lid). The SLP accordingly calculates an initial period of the area-based positioning based upon the relative distance calculated. The calculated initial period is sent to the SET through the SUPL RESPONSE message (S216). The lid denotes a location (position) identifier.

The SET having received the initial period of the area-based positioning through the SUPL RESPONSE message starts a period positioning session (S217). The SET sends the SUPL POS INIT message to the SLP at the corresponding initial period to start the area-based positioning procedure (S218).

Accordingly, the SET and the SLP consecutively exchange messages for performing an actual positioning to perform the SUPL POS procedure, thereby calculating the position of the SET (S219). Here, the positioning (i.e., position calculation) for the SET may be performed by the SLP based upon positioning measurements received from the SET (SET-assisted mode), or be performed by the SET based upon assistance obtained from the SLP (SET-based mode). FIG. 10 illustrates the positioning performed by the SET-based mode. However, if the positioning is performed by the SET-assisted mode, the SLP sends the calculated position value to the SET using the SUPL REPORT message (S220).

Upon completely calculating the position value of the SET, the SET compares the calculated position value with an actual position value set in the area event information so as to check whether the area event has occurred. If it is checked that the area event has not occurred, the SET re-calculates the relative distance between the calculated position value and the requested area, to thereby change the period of the area-based positioning (S221).

Afterwards, the SET sends the SUPL POS INIT message to the SLP at the period for the newly calculated area-based positioning to start the area-based positioning procedure. Here, the changed positioning period is sent to the SLP (S222). Therefore, the SET and the SLP consecutively exchange messages for performing an actual positioning to perform the SUPL POS procedure, thereby calculating the position of the SET (S223). Here, if the positioning is performed by the SET-assisted mode, the SLP sends the calculated position value to the SET using the SUPL REPORT message (S224).

Afterwards, the SET re-compares the newly calculated position value with the actual position value set in the area event information. If the two position values are identical with each other and thus the area event occurs (S225), the SET sends the new position value to the SLP using the SUPL REPORT message (S226). The SLP then sends the SUPL END message to the SET to terminate the SUPL session (S227). Thereafter, the SLP sends the positioning value received from the SET to the SUPL agent using the MLP TLREP message (S228).

Figure 12:
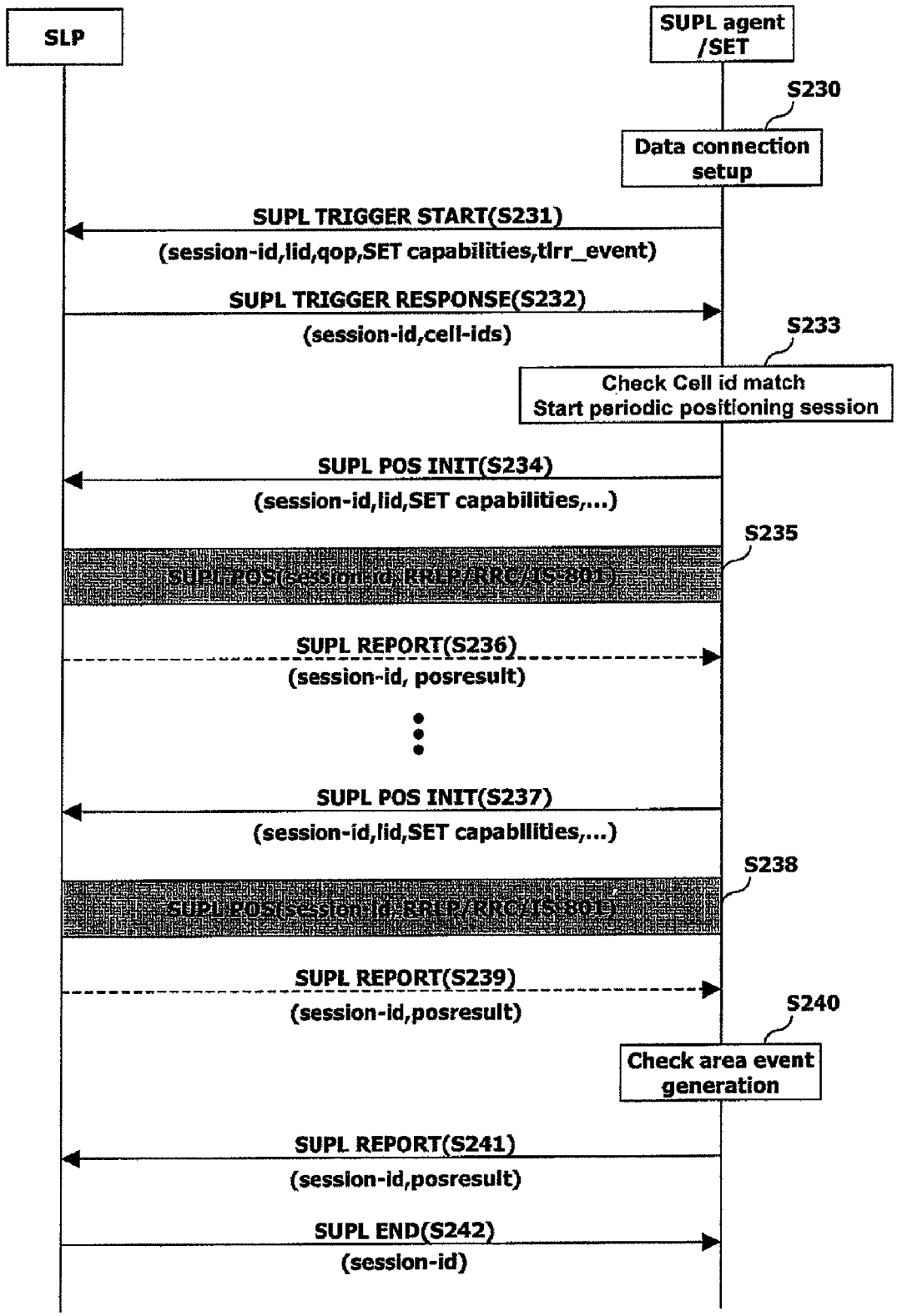
FIG. 12 is a view illustrating an area-based positioning procedure in accordance with a $12^{th}$ embodiment of the present invention, which illustrates SET-trigged case and SET-initiated case for a Non-Roaming Proxy mode.

FIG. 12 is a view illustrating an area-based positioning procedure in accordance with a 12$^{th}$ embodiment of the present invention, which illustrates SET-trigged case and SET-initiated case for a Non-Roaming Proxy mode. The 12$^{th}$ embodiment of the present invention illustrates such that an approximate positioning for the SET is performed using the cell-id as same as in the 10$^{th}$ embodiment, and thereafter performs the periodic area-based positioning only when the calculated position of the SET corresponds to the position defined in the area event information.

As illustrated in FIG. 12, when the SUPL agent requests an area-based positioning, the SET sets a data connection with a packet data network if any data connection is not set between the SET itself and a certain network (S230).

Once setting the data connection, the SET sends a SUPL TRIGGER START message to the SLP to start the area-based positioning procedure (S231). Here, the SET includes a tlr-r_event parameter in the SUPL TRIGGER START message to set a type of the area-based positioning and specified area related information. The SET then sends the message to the SLP.

The SLP having received the SUPL TRIGGER START message determines which cells belong to the specified area. Thereafter, the SLP stores cell ids corresponding to the corresponding cells and also sends the cell ids to the SET using the SUPL TRIGGER RESPONSE message (S232). The SET having received the plurality of cell ids by the SUPL TRIGGER RESPONSE message compares a cell id in which the SET is currently positioned with the cell ids received, to thereby check whether there is a cell id identical with the cell id of the SET (S233). The comparison is executed to check whether the SET has approached the target area through an approximate positioning of the SET.

If one of the plurality of cell ids is identical with the current cell id, the SET recognizes that it has approached the target area, and then starts a periodic area-based positioning. That is, the SET sends the SUPL POS INIT message to the SLP at the area-based positioning period to start the area-based positioning procedure (S234).

Accordingly, the SET and the SLP consecutively exchange messages for performing an actual positioning so as to perform the SUPL POS procedure, thereby calculating the position of the SET (S235). Here, the positioning (i.e., position calculation) for the SET may be performed by the SLP based upon positioning measurements received from the SET (i.e., SET-assisted mode), or be performed by the SET based upon assistance obtained from the SLP (i.e., SET-based mode). FIG. 12 illustrates the positioning performed by the SET-based mode. However, if the positioning is performed by the SET-assisted mode, the SLP sends the calculated position value to the SET using the SUPL REPORT message (S236).

Upon obtaining the position value of the SET, the SET compares the obtained position value with an actual position value set in the area event information to thus check whether the area event has occurred. If it is checked that the area event has not occurred, the steps S237 and S238 are re-performed to calculate a new position value. Here, if the positioning is performed by the SET-assisted mode, the SLP sends the calculated position value to the SET using the SUPL REPORT message (S239).

Afterwards, the SET re-compares the newly calculated position value with the actual position value set in the area event information. If the two values are identical with each other and thus the area event occurs (S240), the SET sends the new position value to the SLP using the SUPL REPORT message (S241). The SLP sends the SUPL END message to the SET to end (terminate) the SUPL session (S242).

Figure 13:
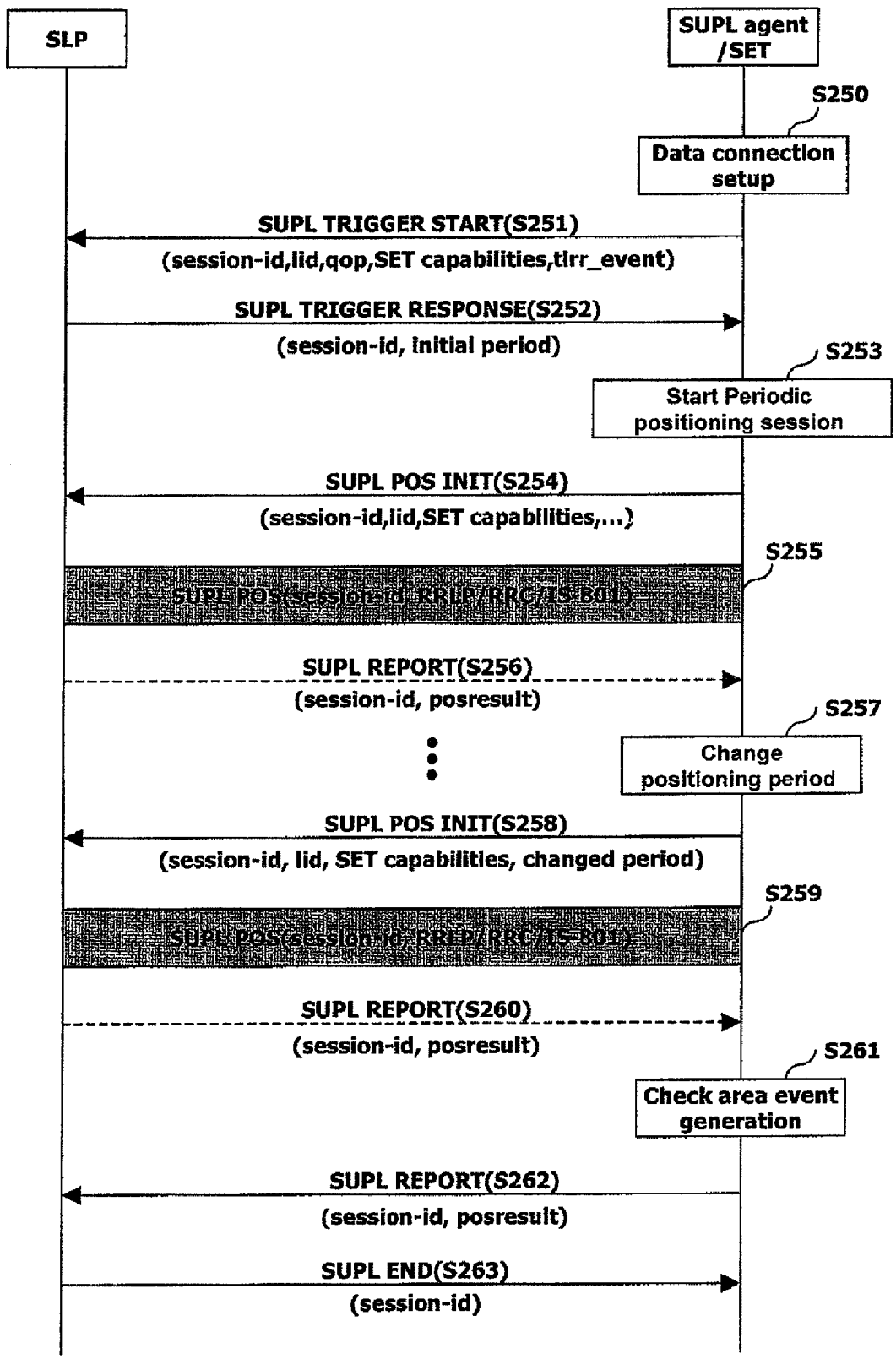
FIG. 13 is a view illustrating an area-based positioning procedure in accordance with a $13^{th}$ embodiment of the present invention, which illustrates SET-trigged case and SET-initiated case for a Non-Roaming Proxy mode.

FIG. 13 is a view illustrating an area-based positioning procedure in accordance with a 13$^{th}$ embodiment of the present invention, which illustrates SET-trigged case and SET-initiated case for a Non-Roaming Proxy mode. The 13$^{th}$ embodiment of the present invention illustrates, as in the 11$^{th}$ embodiment, such that the SLP calculates an initial period information for an area-based positioning to send it to the SET, and the SET performs the positioning according to the initial period information to change the initial period information according to the position of the SET.

As illustrated in FIG. 13, when the SUPL agent requests an area-based positioning, the SET sets a data connection with a packet data network if any data connection is not set between the SET itself and a certain network (S250). Upon setting the data connection, the SET sends a SUPL TRIGGER START message to the SLP to start the area-based positioning procedure (S251). Here, the SET includes a tlrr_event parameter in the SUPL TRIGGER START message to set characteristics of the area-based positioning and specified area related information. The SET then sends the message to the SLP.

The SLP having received the SUPL TRIGGER STAT message calculates a relative distance between the area requested by the SUPL agent and a current position of the SET (i.e., a position approximately estimated using lid). The SLP calculates an initial period of the area-based positioning based upon the calculated relative distance. The calculated period is sent to the SET using the SUPL RESPONSE message (S252).

The SET having received the initial period of the area-based positioning using the SUPL RESPNSE message starts the period positioning session (S253). The SET then sends the SUPL POS INIT message to the SLP at the initial period of the corresponding positioning to start the area-based positioning procedure (S254).

Accordingly, the SET and the SLP consecutively exchange messages for performing an actual positioning so as to perform the SUPL POS procedure, thereby calculating the position of the SET (S255). Here, the positioning of the SET may be performed by the SLP based upon positioning measurements received from the SET (i.e., SET-assisted mode), or be performed by the SET based upon assistance obtained from the SLP (i.e., SET-based mode). FIG. 10 illustrates the positioning performed by the SET-based mode. However, if the positioning is performed by the SET-assisted mode, the SLP sends the calculated position value to the SET using the SUPL REPORT message (S256).

Upon completely calculating the position value of the SET, the SET compares the calculated position value with the actual position value set in the area event information to check whether the area event has occurred. If it is checked the area event has not occurred, the SET re-calculates the relative distance between the calculated position value with the requested area, thereby changing the period for the area-based positioning (S257).

Afterwards, the SET sends the SUPL POS INIT message to the SLP at the newly calculated period for the area-based positioning to start the area-based positioning procedure. Here, the changed positioning period is sent to the SLP (S258). Accordingly, the SET and the SLP consecutively exchange messages for performing the actual positioning so as to perform the SUPL POS procedure, thereby calculating the position of the SET (S259). Here, if the positioning is performed by the SET-assisted mode, the SLP sends the calculated position value to the SET using the SUPL REPORT message (S260).

Then, the SET re-compares the newly calculated position value with the actual position value set in the area event information. If the two values are identical with each other and thus the area event occurs (S261), the SET sends the new position value to the SLP using the SUPL REPORT message (S262). The SLP sends the SUPL END message to the SET to terminate the SUPL session (S263).

Figure 14:
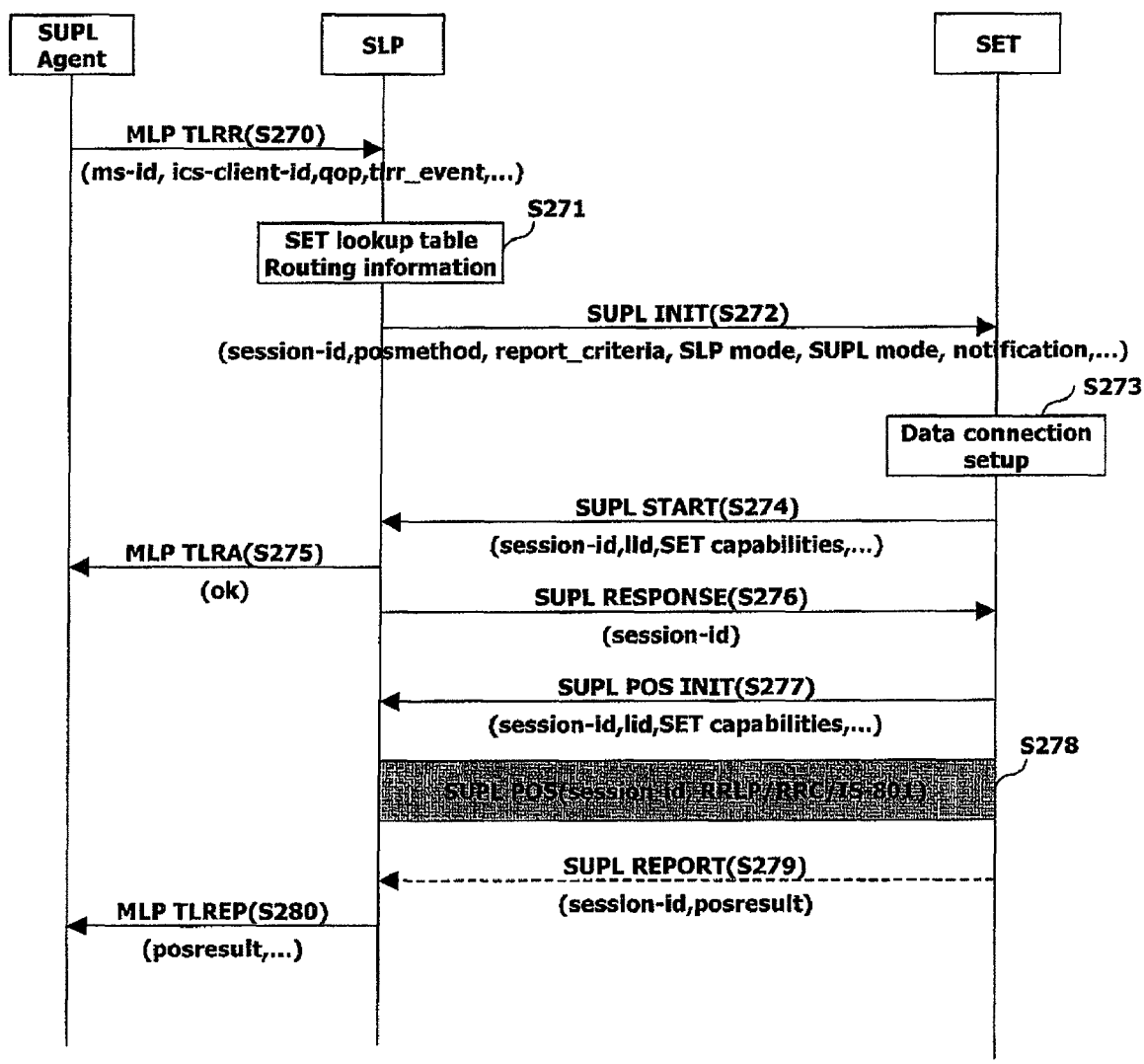
FIG. 14 is a view illustrating an area-based positioning procedure in accordance with a $14^{th}$ embodiment of the present invention, which illustrates SET-trigged case and Network-initiated case for a Non-Roaming Proxy mode.
Figure 15:
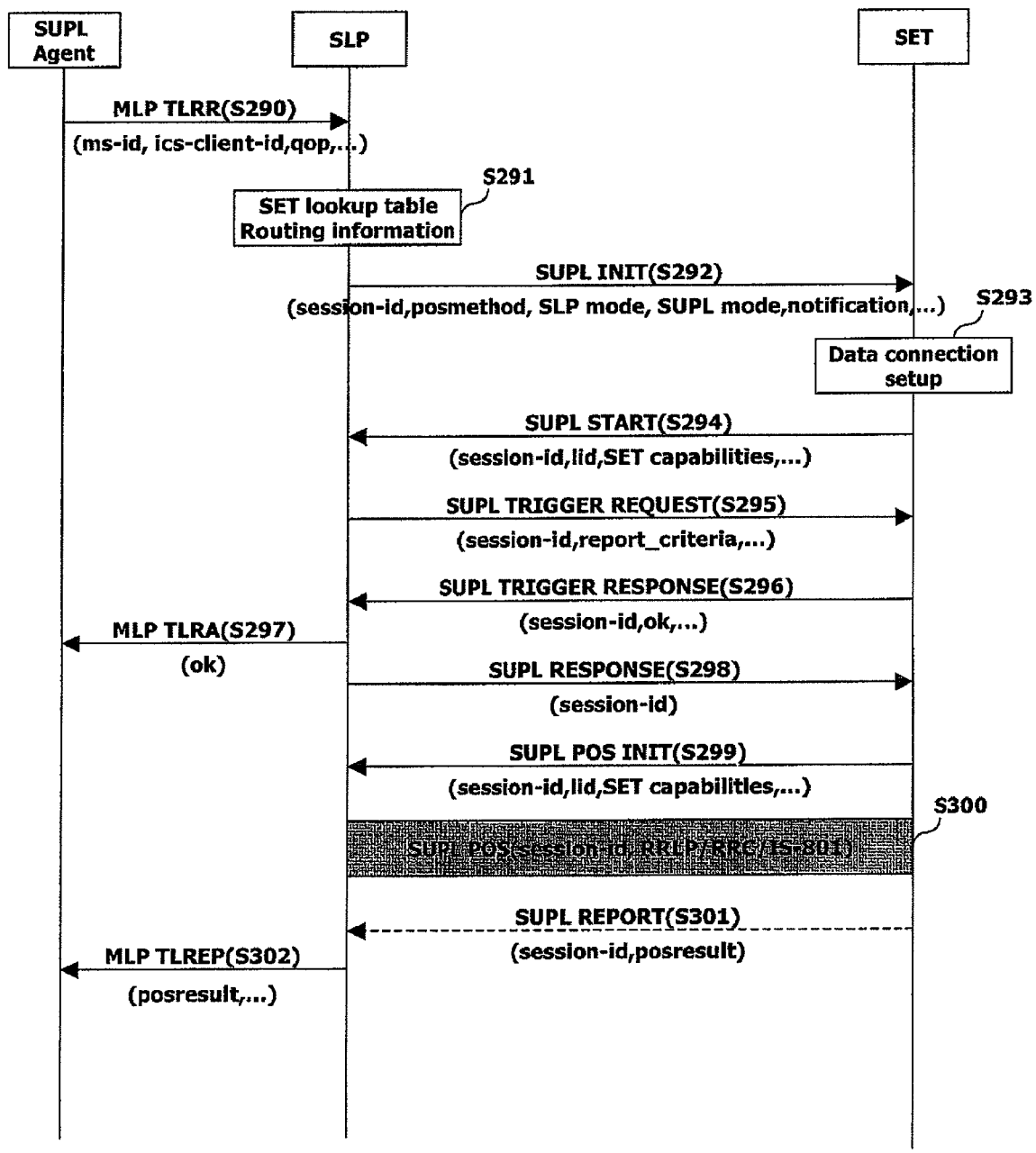
FIG. 15 is a view illustrating an area-based positioning procedure in accordance with a $14^{th}$ embodiment of the present invention, which illustrates SET-trigged case and Network-initiated case for a Non-Roaming Proxy mode.
Figure 16:
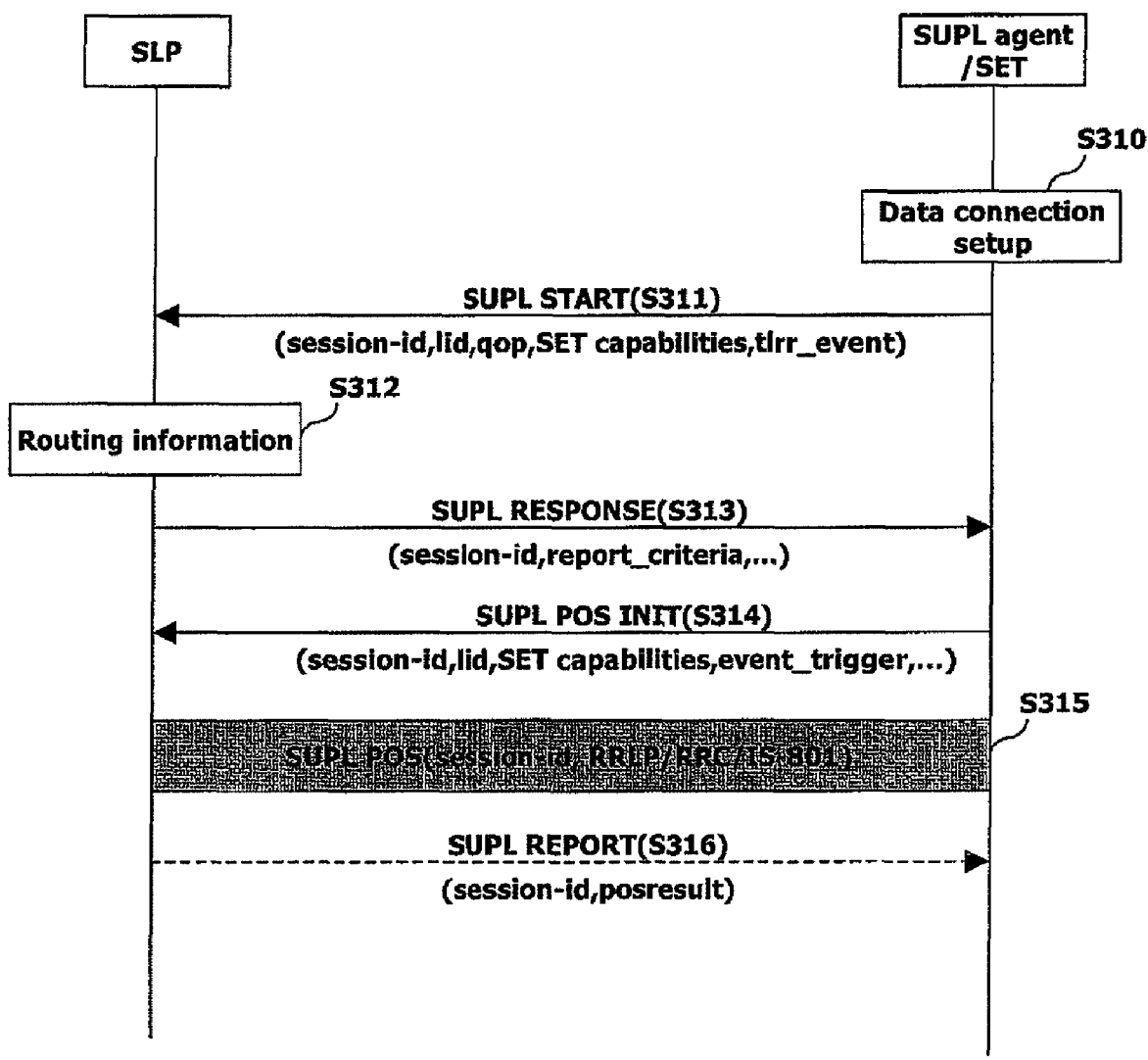
FIG. 16 is a view illustrating an area-based positioning procedure in accordance with a $16^{th}$ embodiment of the present invention, which illustrates SET-trigged case and SET-initiated case for a Non-Roaming Proxy mode.

As aforementioned, the 1$^{st}$ through 13$^{th}$ embodiments of the present invention have explained the case that the area-based positioning is performed in association with the period. However, the area-based positioning is not always performed in association with the period. That is, it is possible that the area-based positioning is performed only when the position value of the SET is identical with the actual position value set in the area event information (i.e., only when the corresponding event occurs based upon pre-stored trigger information). FIGS. 14 through 16 illustrate various types of area-based positioning which are performed regardless of a specified period.

FIG. 14 is a view illustrating an area-based positioning procedure in accordance with a 14$^{th}$ embodiment of the present invention, which illustrates SET-trigged case and Network-initiated case for a Non-Roaming Proxy mode.

When an outer LCS client requests an area-based positioning, a SUPL agent requests an area-based positioning from the SLP using a MLP TLRR message (S270). The MLP TLRR message may include parameters such as ms-id, client-id, QoP, tlrr_event, and the like.

The SLP having received the MLP TLRR message verifies using a lookup table whether the SET supports the SUPL, and verifies using routing information whether the SET is currently SUPL roaming (S271). If it is verified the SET supports the SUPL and is currently not roaming, the SLP sends the SUPL INIT message to the SET to start the SUPL procedure with the SET (S272). Here, the SUPL INIT message may be sent in forms of WAP Push, SMS trigger, SIP Push, UDP/IP, and the like.

The SUPL INIT message may at least include parameters such as session-id, posmethod, report_criteria, SLP mode, SUPL mode, and the like. Here, the SLP mode denotes an operation mode of the SLP. The SUPL mode denotes positioning types. The SLP can verify a privacy of the SET prior to performing the step S271. If the user requires a notification related to location (position) information, the SLP further includes a notification parameter in the MLP TLRR message.

Also, the SLP includes a report_criteria parameter in the SUPL INIT message to send the SUPL INIT message. The SLP uses the report_criteria parameter to send trigger information related to the area-based positioning which has been received from the outer LCS client, namely, the area event information, to the SET. That is, the SLP forwards the trigger information generating the area-based positioning to the SET (i.e., SET-trigged case). The SET is then allowed to perform an actual positioning when the corresponding event occurs.

For example, for the area-based positioning, the SLP includes parameters identifying characteristics of the area-based positioning and a specified area in a certain message to thereby send the message. Here, the name of the specified area such as "Seoul" or "Shingil 1-dong", for example, denotes parameters used for querying the user whether to accept the positioning when the SET user moves to the corresponding area, the parameters being associated with a privacy checkup.

However, for the area-based positioning, the specified area related information (e.g., Seoul or Shingil 1-dong) which has been sent from the SUPL agent using the MLP TLRR message does actually not presented as a cell id on the network. Accordingly, the SLP converts the specified area related information into a network parameter such as the cell id to thusly send it. Also, the SLP sends the name of the specified area as it is using the SUPL INIT message, the name of the specified area having been sent using the MLP TLRR message. The SLP can also send through a separate provisioning protocol the value converted into the network parameter (i.e., cell id) which the SET can recognize.

The SET having received the SUPL INIT message sets a data connection with a packet data network when any data connection is not set between the SET itself and a certain network (S273). Upon setting the data network, the SET stores trigger information received through the SUPL INIT message and thereafter sends the SUPL START message to the SLP (S274).

The SLP sends acknowledgement (i.e., whether the positioning can be performed) with respect to the corresponding positioning request to the SUPL agent by using a MLP TLRA message (S275). The SLP then sends SUPL RESPONSE message to the SET in response to the SUPL START message (S276). Here, when sending the name of the specified area (i.e., a name recognized by the user) sent through the MLP TLRR message as it is by using the SUPL INIT message, the SLP sends the value converted into the network parameter (e.g., cell id or shape information) which the SET can recognize to the SET using the SUPL RESPONSE message.

Afterwards, the SET verifies whether the cell id in which the SET itself is positioned is identical with the cell id included in the trigger information and thereby checks whether the area event has occurred. If it is checked the cell id in which the SET is positioned is identical with the cell id included in the trigger information and thus the area event has occurred (i.e., if the SET is moved into an area defined in the area event information), the SET sends the SUPL POS INIT message to the SLP to start the positioning procedure (S277). Here, if a TCP/IP connection between the SLP and the SET has been disconnected after sending the SUPL RESPONSE message, the SET must reset the data connection prior to sending the SUPL POS INIT message.

The SLP and the SET consecutively exchange messages for performing an actual positioning. The SLP and the SET then calculate the position of the SET through the consecutive messages (S278). The positioning (i.e., position calculation) for the SET may be performed by the SLP based upon positioning measurements received from the SET (i.e., SET-assisted mode), or be performed by the SET based upon assistance obtained from the SLP (i.e., SET-based mode). If the positioning is performed by the SET-based mode, the SET sends the calculated position value to the SLP using the SUPL REPORT message (S279).

Accordingly, the SLP sends the position value calculated by the SLP itself or received from the SET to the SUPL agent using the MLP TLREP message (S280).

The SUPL START and SUPL RESPONSE messages in FIG. 14 may be omitted. In this case, the MLP TLRA may be sent after sending the SUPL POS INIT message. However, when sending the name of the specified area sent by the SLP as it is, as the specified area related information within the SUPL INIT message, and sending the value converted into the network parameter (namely, cell id or shape information) that the SET can recognize by including the value in the SUPL RESPONSE message, the SUPL RESPONSE message can not be omitted.

FIG. 15 is a view illustrating an area-based positioning procedure in accordance with a 15$^{th}$ embodiment of the present invention, which illustrates SET-trigged case and Network-initiated case for a Non-Roaming Proxy mode. The 15$^{th}$ embodiment illustrates that the SLP sends a report_criteria using a new SUPL TRIGGER REQUEST message when the SLP can not send the report_criteria using the SUPL INIT message due to a limitation on the size of the SUPL INIT message. Hence, the 15$^{th}$ embodiment is mostly similar to the 14$^{th}$ embodiment, except adding SUPL TRIGGER REQUEST and SUPL TRIGGER RESPONSE messages.

First, upon performing the steps (S290~S294) for starting the area-based positioning, the SLP sends information regarding the area-based positioning to the SET using a SUPL TRIGGER REQUEST message (S295), so as to make the SET arrange the area-based positioning according to the corresponding information and to allow the SET to separately perform a user confirmation. The SET stores the trigger information sent by the SUPL TRIGGER REQUEST message and thereafter sends a SUPL TRIGGER RESPONSE message in response to the SUPL TRIGGER REQUEST message (S296).

However, unlike in the 14$^{th}$ embodiment, the SLP in the 15$^{th}$ embodiment receives the SUPL TRIGGER RESPONSE message from the SET and thereafter sends the MLP TLRA message to the SUPL agent (S297). This step S297 is performed such that since the SLP sends the SUPL TRIGGER REQUEST message to the SET by including the trigger information related to the area-based positioning therein and receives the SUPL TRIGGER RESPONSE message from the SET in response to the SUPL TRIGGER REQUEST message, it can be identified that the trigger information related to the area-based positioning has been completely sent to the SET only after receiving the SUPL TRIGGER RESPONSE message in the SLP. However, the SUPL TRIGGER RESPONSE message can be omitted. In this case, the SLP sends the SUPL TRIGGER REQUEST message and immediately sends the MLP TLRA message to the SUPL agent.

The SUPL INIT message can be sent in a SMS sending manner. Accordingly, when the report_criteria parameter can not be all included in the SMS, the SUPL TRIGGER REQUEST message may denote a message for separately sending the report_criteria parameter, and the SUPL TRIGGER RESPONSE message corresponds to a message in response to the SUPL TRIGGER REQUEST message.

If it is necessary to separately send the value obtained by converting the name of the specified area into the network parameter (e.g., cell id or shape information) that the SET can identify, the corresponding value may be sent by being included in the SUPL TRIGGER REQUEST message. Also, the name of the specified area sent through the MLP TLRR message may be sent as it is, as the specified area related information within the SUPL TRIGGER REQUEST message. The value (e.g., cell id or shape information) converted into the network parameter that the SET can identify may also be sent by being included in the SUPL RESPONSE message.

Therefore, the SUPL START message and the SUPL RESPONSE message can be omitted in FIG. 14. However, in FIG. 15, when sending the trigger information related to the area-based positioning by using the SUPL TRIGGER REQUEST message and receiving the SUPL TRIGGER RESPONSE message thereafter, the SET first sends the SUPL START message to the SLP to obtain an acceptance of the SLP with respect to the area-based positioning which is included in the SUPL INIT message. Accordingly, only the SUPL RESPONSE message can be omitted. However, the SUPL RESPONSE message can not be omitted, in case of sending the specified area related information (i.e., the name of the specified area sent through the MLP TLRR message) as it is using the SUPL TRIGGER REQUEST message, and sending the value (e.g., cell id or shape information) obtained by converting the name of the specified area into the network parameter through the SUPL RESPONSE message.

The succeeding steps (S298~S302) are the same as the steps (S276~S284), detailed explanation of which will not be repeated accordingly.

FIG. 16 is a view illustrating an area-based positioning procedure in accordance with a 16$^{th}$ embodiment of the present invention, which illustrates SET-trigged case and SET-initiated case for a Non-Roaming Proxy mode.

As illustrated in FIG. 16, when the SUPL agent requests an area-based positioning, the SET requests a data connection from a packet data network if any data connection is not set between the SET itself and a certain network (S310).

Upon setting the data connection, the SET sends a SUPL START message to the SLP to request the area-based positioning (S311). Here, the SET includes (inserts) a tlrr_event parameter in the SUPL START message to set a parameter for identifying characteristics of the area-based positioning, a specified area, and the like, thereby sending the message to the SLP. In particular, for the area-based positioning, the SET sends to the SLP the tlrr_event parameter by representing the specified area therein so as to receive from the SLP the network parameter that the SET itself can actually not identify. For example, the specified area related information (e.g., Seoul or Shingil 1-dong) which a terminal actually sends may possibly be a name of an area in an administrative district or a name of a well-known area. The corresponding name may not be represented as the cell id on an actual network.

Hence, the SET must send the specified area related information to the SLP such that the SLP converts the specified area related information into the network parameter such as the cell id which the SET can recognize that the SET itself has moved to the corresponding area to thusly send the converted network parameter to the SET. Also, in order to receive the cell id of the corresponding area by which it can be identified that the terminal has been moved to the corresponding specified area during its movement, even if the SET exactly knows information regarding the latitude/longitude of the specified area to thereby send the corresponding area related information with the latitude/longitude or coordinates x, y and z, the SET must send the exact position (area) information to the SLP and then receive the cell id of the corresponding area from the SLP. This is because only the SLP has known cell ids constructing the areas related to the area-based positioning.

The SLP having received the SUPL START message verifies using routing information whether the SET is SUPL roaming (S312). If the SET is not roaming, the SLP sends the SUPL RESPONSE message to the SET in response to the SUPL START message (S313).

The SLP sends the SUPL RESPONSE message by including a report_criteria parameter therein. The parameter is sent to the SET by including area event information related to the area-based positioning request received from the SET therein. That is, the SLP forwards the trigger information generating the area-based positioning to the SET, so as to allow the performance of the actual positioning procedure in the SET when the corresponding event occurs. Particularly, for the area-based positioning, the specified area related information (e.g., Seoul or Shingil 1-dong) sent from the SUPL agent using the MLP TLRR message is actually not represented as the cell id on the network. Accordingly, the SLP converts the specified area into a network parameter such as the cell id to thereafter send the cell id to the SET. The SLP also uses the SUPL INIT message to send the name of the specified area sent through the MLP TLRR message as it is. The value converted into the network parameter (e.g., cell id) that the SET can recognize may be sent through a separately provisioning protocol.

Afterwards, when a specific event occurs based upon the stored trigger information (i.e., when the SET is moved into the corresponding area), the SET sends the SUPL POS INIT message to the SLP to start the area-based positioning procedure (S314). Here, the SET can inform the SLP using an event_trigger parameter which event has occurred. Here, if a TCP/IP connection between the SLP and the SET has been released after sending the SUPL RESPONSE message, the SET must reset the data connection prior to sending the SUPL POS INIT message.

Therefore, the SET consecutively exchanges messages for performing the actual positioning with the SLP to calculate the position of the SET (S315). Here, the positioning (i.e., position calculation) for the SET may be performed by the SLP based upon the positioning measurements received from the SET (i.e., SET-assisted mode), or be performed by the SET based upon assistance obtained from the SLP. FIG. 16 illustrates the positioning is performed by the SET-based mode. However, if the positioning is performed by the SET-assisted mode, the SLP sends the position value calculated to the SET using the SUPL REPORT message (S316).

Figure 17:
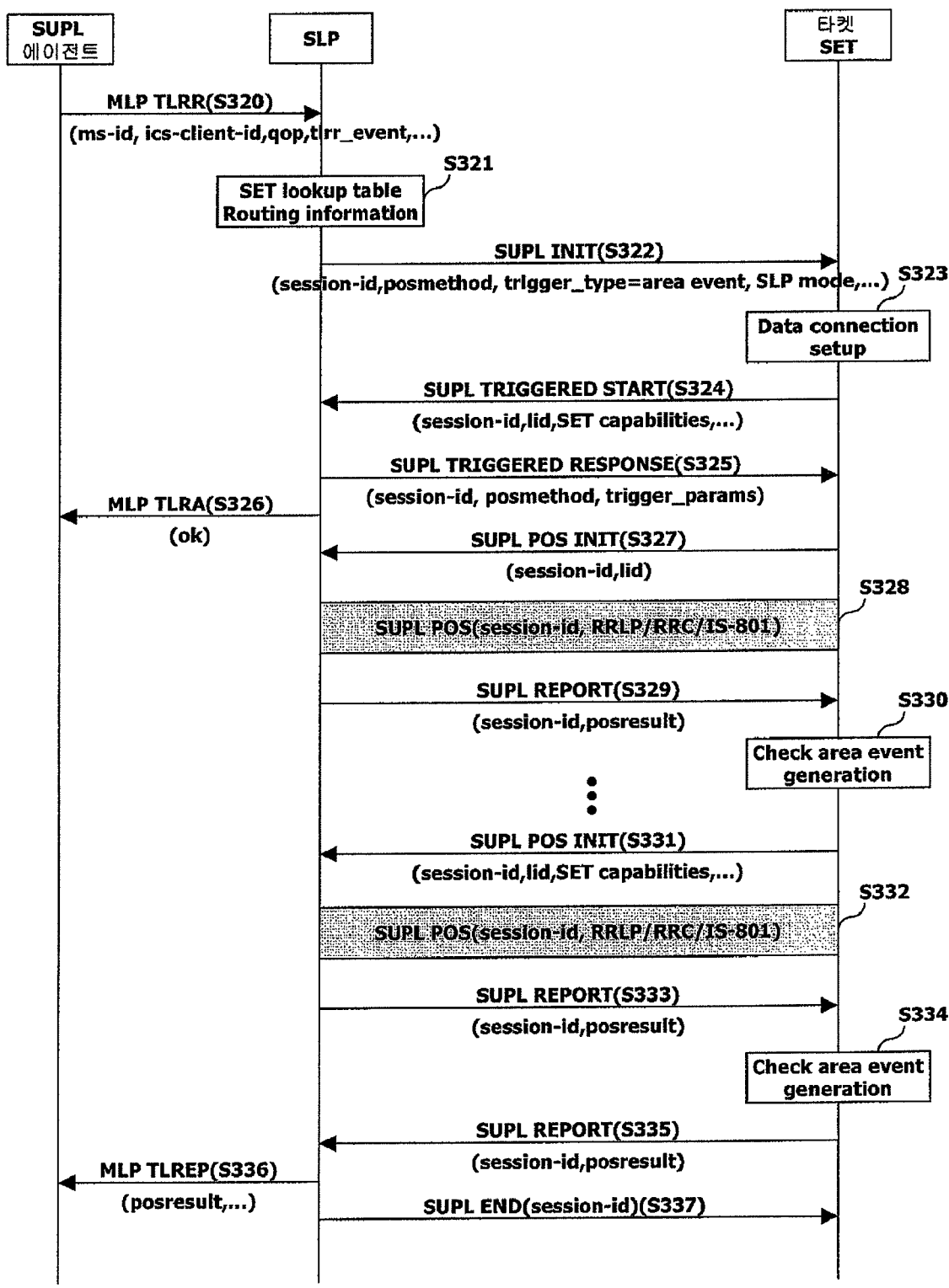
FIG. 17 is a view illustrating an area-based positioning procedure in accordance with a first embodiment of the present invention, which illustrates a SET-trigged case and a Network-initiated case for a SET-assisted mode.

FIG. 17 is a view illustrating an area-based positioning procedure in accordance with a first embodiment of the present invention, which illustrates a SET-trigged case and a Network-initiated case for a SET-assisted mode.

As illustrated in FIG. 17, when an outer LCS client requests an area-based positioning, the SUPL agent sends an MLP TLRR message to the SLP (S320).

The MLP TLRR message may include parameters such as ms-id, client-id, QoP, tlrr_event, etc. ms-id denotes a target SET, QoP denotes a positioning accuracy (e.g., a time delay and a spatial accuracy), and tlrr_event denotes a positioning related trigger parameter which denotes, for example, various condition information regarding the positioning such as characteristics of the area-based positioning (e.g., whether the target SET (e.g., a terminal) is moved into or out of a specified area, positioned in the specified area, or the like) and a specified area (e.g., a name of the specified area, an exact position value, or the like).

The MLP TLRR message may further include parameters related to types of the positioning values (which represent a current value or a value obtained in the latest time), and parameters for setting priorities with respect to each positioning request for several positioning requests.

The SLP having received the MLP TLRR message verifies using a lookup table whether the target SET supports the SUPL, and verifies using routing information whether the target SET is currently SUPL roaming (S321).

If it is verified that the SET supports the SUPL and is currently not roaming, the SLP sends a SUPL initializing (SUPL INIT) message to the SET so as to start the SUPL procedure with the SET (S322). Here, the SUPL INIT message may be sent in forms of a Wireless Application Protocol (WAP) push, a Short Message Service (SMS) trigger, a Session Initiation Protocol (SIP) push, UDP/IP, or the like, for example.

The SUPL INIT message may include at least session-id, trigger type indicator (e.g., area event), SLP mode (i.e., a Proxy mode or a Non-Proxy mode), positioning method (pos-method) to be used, and the like. Also, the SLP confirms a privacy of the SET prior to performing the step S321. If the user requires a notification related to location (position) information, the SLP further includes a notification parameter in the SUPL INIT message.

Hence, the SLP sends the SUPL INIT message by including a trigger type parameter therein. This parameter may be used to inform the SET that the area-based positioning has been requested and the corresponding positioning is to be executed by the SLP (i.e., Network-trigged case).

The SET having received the SUPL INIT message recognizes that the SLP uses the proxy mode, and sets a secure IP connection with the SLP. The SET sets a data connection with a packet data network (i.e., 3GPP or 3GPP2) when any data connection is currently not set between the SET itself and a certain network (S323). Once setting the data connection, the SET sends a SUPL TRIGGER START message to the SLP to start an area-event triggered session (S324). Here, the SUPL TRIGGER START message may include at least session-id, lid and SET capability information.

Upon receiving the SUPL TRIGGER START message, the SLP selects a positioning method to be used in the area event triggered session, and sends a SUPL TRIGGER RESPONSE message including session-id, posmethod and a trigger parameter (trigger_params) to the SET (S325). The trigger parameter indicates an area event triggered parameter related to the positioning. The trigger parameter(s) is a part of parameter(s) pertaining to the area event triggers.

For example, the trigger parameter may include characteristics of the area event and trigger condition information indicating a specified area. The characteristic of the area event can be used to represent whether the SET is moved into or out of the specified area, or positioned in the specified area. Also, the SUPL TRIGGER RESPONSE message may include location identifiers (location ids) of an area specified for the area event triggered session. Preferably, the location ids may denote information indicating an actual location area on the network such as cell id(s) belonging to the area for which the SUPL agent has requested positioning, MCC, MNC or LAC, or a scrambling code number. In particular, for a WCDMA, the location id denotes a primary scrambling code number.

In addition, the SLP informs the SUPL agent of the acceptance of the positioning request using a MLP TLRA message. (S326).

For receiving the location id(s) through the SUPL TRIGGER RESPONSE message, the SET sends the SUPL POS INIT message to the SLP only when a trigger condition is satisfied.

For example, whether the trigger condition is satisfied may be verified by comparing the location id of the current SET with the location ides received from the SLP. That is, the SET compares the cell id in which the SET is currently positioned with the plurality of cell ids received, to thus check whether there is a cell id identical with its cell id.

If the characteristics of the area event included in the trigger parameter indicate that the SET is moved into the specified area or positioned in the specified area, the SET starts the periodic positioning only when at least one of the location ides received from the SLP is identical with the location id of the SET. Conversely, if the characteristics of the area event indicate that the SET is moved out of the specified area, the SET starts the periodic positioning only when any of the location ides received is not identical with the location id of the SET.

The comparison is performed to check whether the SET is moved near the area requested by the SUPL agent by an approximate positioning of the SET.

If it is checked by the comparison of the location ids that the trigger condition is satisfied, the SET identifies that the SET itself has been moved near the requested area, and then sends a SUPL POS INIT message to the SLP to start a positioning session (S327). The SUPL POS INIT message may include at least session-id and a location identifier (lid).

The SLP and the SET consecutively exchange messages for performing an actual positioning to calculate the position of the SET (S328). Preferably, the message exchanged between the SLP and the SET may include a session id, protocols (e.g., RRLP, RRC or TIA-801) to be used for the positioning, and the like. The positioning (i.e., position calculation) for the SET may be performed by the SLP based upon positioning measurements received from the SET (i.e., SET-assisted mode), or be performed by the SET based upon assistance obtained from the SLP (i.e., SET-based mode). In the embodiment, the positioning is performed by the SET-assisted mode, and accordingly the SLP sends the calculated position value (i.e., posresult) to the SET through the SUPL REPORT message (S329). If the positioning is performed by the SET-based mode, the SUPL REPORT message is not required.

Hence, upon receiving the position value (i.e., posresult) of the SET from the SLP, the SET compares the calculated position value with a position value of the specified area defined in the trigger parameter so as to check whether the trigger condition is satisfied, namely, the area event has occurred (S330).

According to the comparison, if the position value of the SET is identical with the position value defined in the trigger parameter (i.e., if the area event occurs), the SET performs operations succeeding a step (S335). If the two values are not identical with each other, the SET sends the SUPL POS INIT message to the SLP to re-inform the SLP of the start of the positioning session (S331). Afterwards, the SLP and the SET consecutively exchange messages for performing an actual positioning to calculate the position of the SET (S332), and sends the calculated position value (i.e., posresult) to the SET through the SUPL REPORT message (S333).

Upon receiving the position value (posresult) of the SET from the SLP, the SET compares the calculated position value with a position value of the specified area defined in the trigger parameter to check whether the area event has occurred (S334). According to the comparison, if the area event has not occurred, the SET repeatedly performs the steps as same as the steps (S21~S23). If identical with each other, the SET sends the SUPL REPORT message to the SLP (S335). The SUPL REPORT message may include at least session-id and the position value (i.e., posresult) occurring the area event.

Accordingly, the SLP sends the area-based positioning value to the SUPL agent through the MLP TLREP message (S336), and sends the SUPL END message to the SET to inform the SET of the end (termination) of the positioning session (S337). The SET having received the SUPL END message releases an IP connection with the SLP and also releases all of the resources related to the positioning session.

Figure 18:
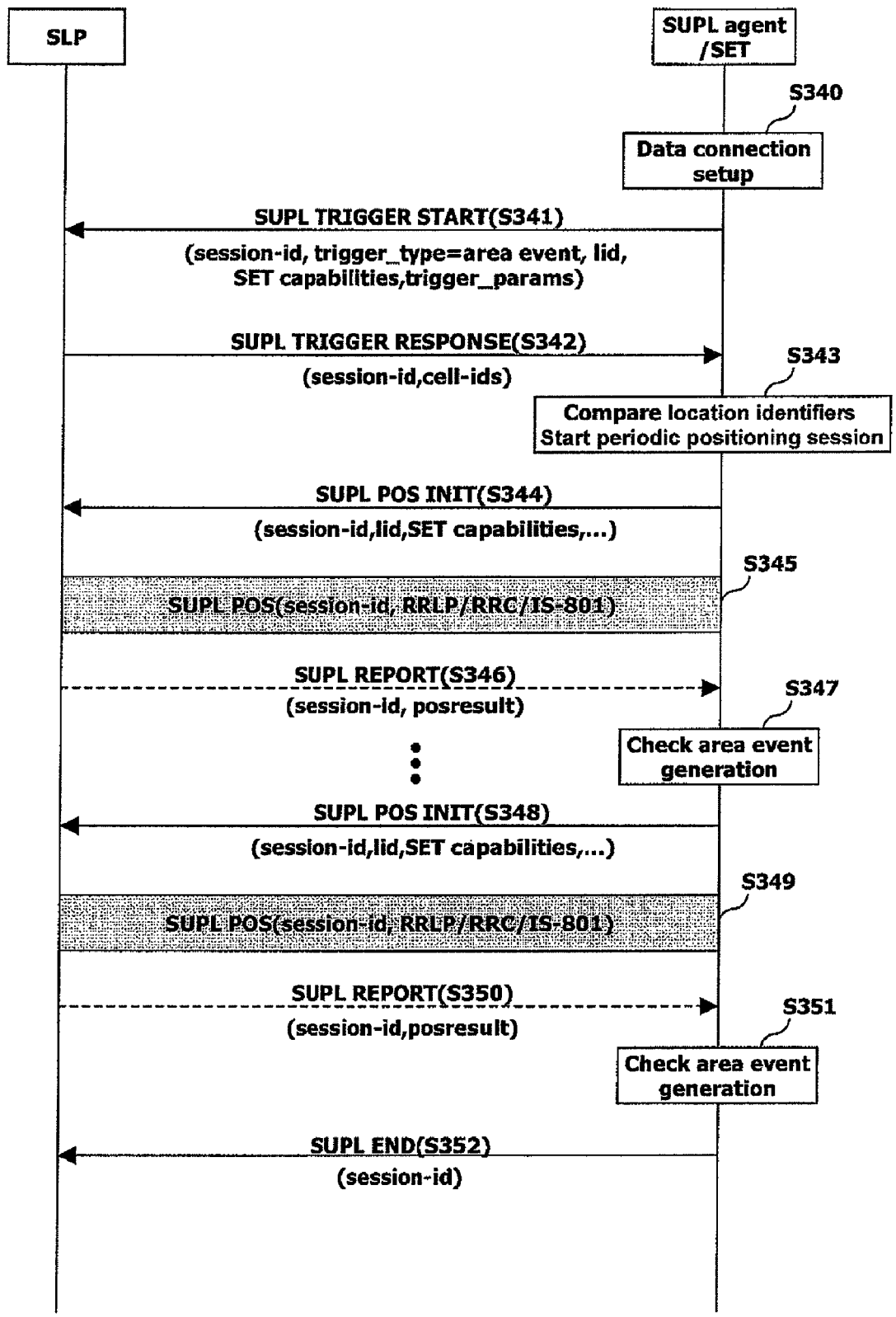
FIG. 18 is a view illustrating an area-based positioning procedure in accordance with a second embodiment of the present invention, which illustrates a SET-trigged case and a SET-initiated case for a Non-Roaming Proxy mode.

FIG. 18 is a view illustrating an area-based positioning procedure in accordance with a second embodiment of the present invention, which illustrates a SET-trigged case and a SET-initiated case for a Non-Roaming Proxy mode.

As illustrated in FIG. 18, when a SUPL agent within the SET requests an area event triggered service, the SET sets a data connection with a packet data network if any data connection is not set between the SET itself and a certain network (S340).

Upon setting the data connection, the SET sets a secure IP connection with a H-SLP using a default address provisioned from a home network. Then, the SET sends a SUPL TRIGGER START message to the SLP to start a positioning session (S341). The SUPL TRIGGER START message may include at least session-id, trigger type indicator (e.g., area event), lid, SET capabilities, and a trigger parameter (trigger_params).

The trigger parameter denotes an area event triggered parameter related to a positioning. The trigger parameter(s) is a part of parameter(s) pertaining to the area event triggers.

The trigger parameter may include several trigger condition information, for example, characteristics of the area event and a specified area. The characteristics of the area event may include several condition information which indicates whether the SET is moved into or out of the specified area, or positioned in the specified area.

The SLP having received the SUPL TRIGGER START message determines which cells belong to the specified area within the trigger parameter. The SLP then stores location identifiers (location ids) of the corresponding area and also sends the location ids to the SET through the SUPL TRIGGER RESPONSE message (S342). Preferably, the location id(s) may denote information indicating an actual location area on the network (e.g., cell id(s) belonging to the area for which the SUPL agent has requested positioning, a Mobile Country Code (MCC), a Mobile Network Code (MNC), a Location Area Code (LAC), etc.), or a scrambling code number. Particularly, for a WCDMA, the location id corresponds to the primary scrambling code number.

The SET having received the location id through the SUPL TRIGGER RESPONSE message sends the SUPL POS INIT message when the event trigger condition is satisfied. That is, the SET compares the location id of the current SET with the location ids received (S343). For example, the SET compares the cell id in which the SET is currently positioned with the plurality of cell ids received, to thereby check whether there is a cell id that is identical with the cell id in which the SET is positioned.

If the characteristics of the area event included in the trigger parameter indicate that the SET is moved into the specified area or positioned in the specified area, the SET starts the periodic positioning only when at least one of the location ides received from the SLP is identical with the location id of the SET. Conversely, if the characteristics of the area event indicate that the SET is moved out of the specified area, the SET starts the periodic positioning only when any of the location ides received is not identical with the location id of the SET. The comparison is performed to check whether the SET is moved near the area requested by the SUPL agent by an approximate positioning of the SET.

According to the comparison, if at least one of the location ids received is identical with the current location id of the SET, the SET recognizes that the SET itself has approached the requested area, and then sends the SUPL POS INIT message to the SLP to start the positioning session (S344). The SUPL POS INIT message may include at least session-id and a location identifier (lid).

The SLP and the SET consecutively exchange messages for performing an actual positioning to calculate the position of the SET (S345). Here, the positioning (i.e., position calculation) for the SET may be performed by the SLP based upon positioning measurements received from the SET (i.e., SET-assisted mode), or be performed by the SET based upon assistance obtained from the SLP (i.e., SET-based mode). In the embodiment of FIG. 18, the positioning is performed by the SET-based mode. However, if the positioning is performed by the SET-assisted mode, the SLP sends the calculated position value to the SET through the SUPL REPORT message (S346).

When the position value of the SET is calculated, the SET compares the calculated position value with a position value of the specified area defined in the trigger parameter so as to check whether the trigger condition is satisfied, namely, the area event has occurred (S347). According to the comparison, if the trigger condition is not satisfied, the SET calculate a new position value by performing the steps S348 and S349. Here, if the positioning is performed by the SET-assisted mode, the SLP sends the calculated position value to the SET using the SUPL REPORT message (S350).

Upon calculating the new position value, the SET compares the newly calculated position value with the position value of the specified area defined in the trigger parameter to check whether the trigger condition is satisfied (i.e., whether the area event has occurred) (S351). If the trigger condition is satisfied, the SET reports the newly calculated position value to the inner agent and then sends the SUPL END message to the SLP (S352).

As described above, the present invention proposes the method for performing the area-based positioning in the SUPL-based positioning method, so as to allow implementation of various positioning methods based upon the SUPL.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An area-based positioning method for a mobile communications system wherein said system is conformed to the existing Open Mobile Alliance SUPL standard, the method performed by a server and comprising:
    sending a SUPL INIT message to a SET in order to initiate a SUPL procedure for an area event triggered session, based upon a positioning request for the SET, the SUPL INIT message comprising a session-id, an intended positioning method, a proxy/non-proxy mode indicator, and a trigger type indicator;
    sending a SUPL TRIGGERED RESPONSE message to the SET in response to receiving a SUPL TRIGGERED START message from the SET in order to start an area event triggered session with the SET,
    wherein the SUPL TRIGGERED START message comprising comprises a session-id, a location-id, and SET capabilities, and the SUPL TRIGGERED RESPONSE message comprises at least one of a session-id, a positioning method, trigger parameters, and location identifiers of an area specified for the area event triggered session;
    receiving a SUPL POS INIT message from the SET to start the area event triggered session, when a comparison performed by the SET of a current area-id and the location identifiers of the area specified for the area event triggered session indicates that positioning of the SET is to be executed;
    exchanging position procedure messages with the SET during the positioning session to calculate actual positioning information indicating longitudinal and latitudinal values of the SET;
    sending a SUPL REPORT message to the SET, the SUPL REPORT message including the session-id and the calculated actual positioning information of the SET, in order to allow the SET, which operates in SET-based mode, to compare the calculated actual positioning information with the trigger parameters; and
    receiving a SUPL REPORT message from the SET, the SUPL REPORT message including the session-id and the calculated actual positioning information of the SET, if the calculated actual positioning information indicates that the trigger parameters are satisfied by the SET.

2. The method of claim 1, wherein the positioning request for the SET is received from a SUPL Agent.

3. The method of claim 2, further comprising: informing the SUPL Agent that the positioning request for the SET is accepted, after sending the SUPL TRIGGERED RESPONSE message to the SET.

4. The method of claim 1, wherein the location identifiers comprise at least one of cell id(s) belonging to the positioning-requested area, Mobile Country Code (MCC), Mobile Network Code (MNC), Location Area Code (LAC), a scrambling code number, and a primary scrambling code number.

5. The method of claim 2 further comprising:
sending, to the SUPL Agent, a REPORT message that includes the calculated position value.

6. The method of claim 1, further comprising:
sending, to the SET, a SUPL END message to end the area event triggered session.

7. The method of claim 1, wherein the trigger parameters are satisfied by the SET if the SET has moved into or out of a specified area or positioned in the specified area.

8. The method of claim 1, wherein the trigger parameters include information about a specific area and condition information about whether the SET has moved into or out of a specified area or positioned in the specified area.

9. An area-based positioning method for a mobile communications system wherein said system is conformed to the existing Open Mobile Alliance SUPL standard, the method performed by a SUPL Enabled Terminal (SET) and comprising:
receiving a SUPL INIT message from a server in order to initiate a SUPL procedure for an area event triggered session, based upon a positioning request for the SET, the SUPL INIT message comprising a session-id, an intended positioning method, a proxy/non-proxy mode indicator, and a trigger type indicator;
receiving a SUPL TRIGGERED RESPONSE message from the server in response to sending a SUPL TRIGGERED START message to the server in order to start an area event triggered session with the SET,
wherein the SUPL TRIGGERED START message comprising comprises a session-id, a location-id, and SET capabilities, and the SUPL TRIGGERED RESPONSE message comprises at least one of a session-id, a positioning method, trigger parameters, and location identifiers of an area specified for the area event triggered session;
sending a SUPL POS INIT message to the server to start the area event triggered session, when a comparison performed by the SET of a current area-id and the location identifiers of the area specified for the area event triggered session indicates that positioning of the SET is to be executed;
exchanging, with the server, positioning procedure messages to calculate actual positioning information indicating longitudinal and latitudinal values of the SET;
calculating the actual positioning information when the SET operates in SET-based mode;
comparing the calculated actual positioning information with the trigger parameters after receiving a SUPL REPORT message from the server, the SUPL REPORT message including the session-id and the calculated actual positioning information of the SET; and
sending a SUPL REPORT message to the server, the SUPL REPORT message including the session-id and the calculated actual positioning information of the SET, if the calculated actual positioning information indicates that the trigger parameters are satisfied by the SET.

10. The method of claim 9, wherein the location identifiers comprise at least one of cell id(s) belonging to the positioning-requested area, Mobile Country Code (MCC), Mobile Network Code (MNC), Location Area Code (LAC), a scrambling code number, and a primary scrambling code number.

11. The method of claim 9, further comprising:
receiving, from the server, a SUPL END message to end the area event triggered session.

12. The method of claim 9, wherein the trigger parameters are satisfied by the SET if the SET has moved into or out of a specified area or positioned in the specified area.

13. The method of claim 9, wherein the trigger parameters include information about a specific area and condition information about whether the SET has moved into or out of a specified area or positioned in the specified area.

14. An area-based positioning method for a mobile communications system wherein said system is conformed to the existing Open Mobile Alliance SUPL standard, the method performed by a server and comprising:
receiving a SUPL TRIGGERED START message from the SET in order to start an area event triggered session with the SET,
wherein the SUPL TRIGGERED START message comprises a session-id, a location-id, trigger type indicator, SET capabilities and trigger parameters;
sending, to the SET, a SUPL TRIGGERED RESPONSE message that includes at least one of a session-id, a positioning method and location identifiers of an area specified for the trigger parameters;
receiving a SUPL POS INIT message from the SET to start a positioning session when a current area-id and at least one of the location identifiers matches with each other;
exchanging position procedure messages with the SET, which operates in SET-based mode, during the positioning session to calculate actual positioning information indicating longitudinal and latitudinal values of the SET; and
receiving a SUPL END message from the SET to end the area event triggered session.

15. The method of claim 14, wherein the trigger type indicator indicates an area event.

16. The method of claim 14, wherein the trigger parameters include information about a specific area and condition information about whether the SET has moved into or out of a specified area or positioned in the specified area.

17. The method of claim 14, wherein the location identifiers comprise at least one of cell id(s) belonging to the positioning-requested area, Mobile Country Code (MCC), Mobile Network Code (MNC), Location Area Code (LAC), a scrambling code number, and a primary scrambling code number.

18. An area-based positioning method for a mobile communications system wherein said system is conformed to the existing Open Mobile Alliance SUPL standard, the method performed by a SUPL Enabled Terminal (SET) and comprising:
sending a SUPL TRIGGERED START message to a server in order to start an area event triggered session with the SET,
wherein the SUPL TRIGGERED START message comprises a session-id, a location-id, trigger type indicator, SET capabilities and trigger parameters;
receiving, from the server, a SUPL TRIGGERED RESPONSE message that includes at least one of a session-id, a positioning method and location identifiers of an area specified for the trigger parameters;

sending a SUPL POS INIT message to the server to start a positioning session when a current area-id and at least one of the location identifiers matches with each other;

exchanging position procedure messages with the server during the positioning session to calculate actual positioning information indicating longitudinal and latitudinal values of the SET;

calculating the actual positioning information when the SET operates in SET-based mode; and sending a SUPL END message to the server to end the area event triggered session.

19. The method of claim 18, wherein the trigger type indicator indicates an area event.

20. The method of claim 18, wherein the trigger parameters include information about a specific area and condition information about whether the SET has moved into or out of a specified area or positioned in the specified area.

21. The method of claim 18, wherein the location identifiers comprise at least one of cell id(s) belonging to the positioning-requested area, Mobile Country Code (MCC), Mobile Network Code (MNC), Location Area Code (LAC), a scrambling code number, and a primary scrambling code number.

22. The method of claim 18, further comprising:

forwarding the calculated actual positioning information to an internal agent within the SET.

* * * * *